Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957 17 Sheets-Sheet 1

INVENTORS
William A. Gussow
John J. Mikos,
BY Robert R. Lockwood
atty.

Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957 17 Sheets-Sheet 2

INVENTORS
William A. Gussow,
John J. Mikos,
BY Robert R. Lockwood
Atty.

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957

INVENTORS
William C. Gussow,
BY John J. Mikos,
Robert R. Lockwood
atty

Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957 17 Sheets-Sheet 4

INVENTORS.
William A. Gussow,
John J. Mikos,
BY Robert R. Lockwood
Atty

INVENTORS
William A. Gussow,
BY John J. Mikos,
Robert R. Lockwood
Atty

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957 17 Sheets-Sheet 6

INVENTORS.
William A. Gussow,
BY John J. Mikos,
Robert R. Lockwood
Atty

INVENTORS.
William A. Gussow
BY John J. Mikos
Robert R. Lockwood
Atty.

Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957

17 Sheets-Sheet 8

INVENTORS
William A. Gussow,
BY John J. Mikos,
Robert R. Lockwood
atty

Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957

17 Sheets-Sheet 9

INVENTORS
William A. Gussow
John J. Mikos,
BY Robert R. Lockwood
Atty

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957

17 Sheets-Sheet 10

INVENTORS.
William A. Gussow,
BY John J. Mikos,
Robert R. Lockwood
Attys

INVENTORS
William A. Gussow
BY John J. Mikos,
Robert R. Lockwood
atty

INVENTORS.
William A. Gussow
BY John J. Mikos
Robert R. Lockwood
Atty.

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957

INVENTORS.
William A. Gussow,
John J. Mikos,
BY Robert R. Lockwood
Atty.

Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957 17 Sheets-Sheet 14

INVENTORS.
William A. Gussow,
By John J. Mikos,
Robert R. Lockwood Atty.

Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957

17 Sheets-Sheet 15

INVENTORS
William A. Gussow
John J. Mikos,
By Robert R. Lockwood
Atty.

Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957 17 Sheets-Sheet 16

INVENTORS.
By William A. Gussow,
John J. Mikos,
Robert R. Lockwood
Atty

Oct. 27, 1964 W. A. GUSSOW ETAL 3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

Original Filed Dec. 23, 1957

17 Sheets-Sheet 17

INVENTORS
William A. Gussow,
John J. Mikos,
BY Robert R. Lockwood
Atty

United States Patent Office 3,154,656
Patented Oct. 27, 1964

3,154,656

CIRCUIT INTERRUPTER PROVIDED WITH MAIN AND AUXILIARY CONTACTS IN PARALLEL SEQUENTIALLY OPERABLE TO OPEN THE CIRCUIT FIRST AT THE MAIN CONTACTS FOLLOWED BY THE AUXILIARY CONTACTS

William A. Gussow, St. Petersburg, Fla., and John J. Mikos, Highland Park, Ill., assignors to S & C Electric Company, Chicago, Ill., a corporation of Delaware Original application Dec. 23, 1957, Ser. No. 704,397, now Patent No. 3,030,481, dated Apr. 17, 1962. Divided and this application May 16, 1961, Ser. No. 120,106
20 Claims. (Cl. 200—145)

This invention relates, generally, to high voltage circuit interrupters and it has particular relation to load break disconnecting switches. This application is a division of application Serial No. 704,397, filed December 23, 1957, now Patent No. 3,030,481, issued April 17, 1962.

Among the objects of this invention are: To employ parallel arranged series connected main and auxiliary contact means for the load interrupter contacts and to open the main contact means first and thereafter the auxiliary contact means; to provide for distributing the voltage across the series connected contact means in open position thereof; to employ for the main contact means relatively heavy contacts capable of continuously carrying load current and withstanding the flow of short circuit current and for the auxiliary contact means employing relatively light weight contacts the movable portion of which can be accelerated rapidly to quickly open the circuit; to secure the relatively heavy movable contacts to an insulating operating member in such manner as not to be adversely affected by heat generated by flow of excess current, such as high momentary overloads or short circuits; to vent the arc products resulting from separation of the auxiliary contacts to the atmosphere and to seal the remaining parts of the current interrupter against contamination by such arc products; to provide a construction for the main and auxiliary contacts such that the magnetic forces generated by current flow tend to increase the contact pressure as a function of the current flow; to provide arc extinguishing means for the auxiliary contact means; to bias the main contact means of the load interrupter to the open position by a spring interposed between the mechanism housing and a main operating arm; to bias the auxiliary contact means of the load interrupter to the open position by an auxiliary spring interposed between the main operating arm and an auxiliary operating arm; to employ the kinetic energy of the main contact means and a portion of the biasing action of the spring operating the same to move the auxiliary contact means to open position; to wind up the spring on the reverse movement of the main and auxiliary operating arms during the rotation of the intermediate insulator in completing opening movement of the switch blade; to apply the operating torque through a single shaft for opening and closing the switch blade and load interrupter; to enclose the main and auxiliary contact means within an insulating housing which extends between the line terminal and the mechanism housing and holds the latter against rotation; and to provide a load interrupter construction in which the number of unenclosed moving parts subject to being encased by ice is reduced to a minimum.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which is set forth in the appended claims.

For a more complete understanding of the nature and scope of this invention reference can be had to the following detailed description, taken together with the accompanying drawings, in which:

FIG. 1 is a top plan view showing how the switch means of the present invention can be installed for overhead upright mounting on the frame structure, only one pole of the switch being illustrated with the supports for two others being shown for a typical three phase installation, the mechanism being shown in the position that it occupies when the disconnecting switch blade is closed and the load current interrupter is closed;

Figure 8:
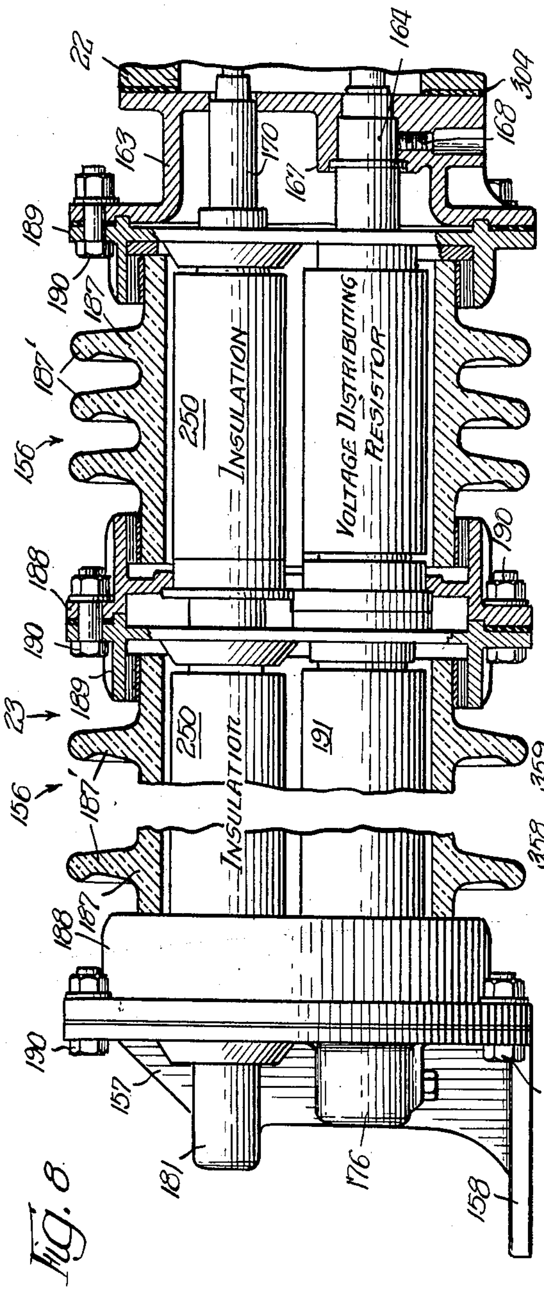
FIG. 8 is a longitudinal vertical sectional view of the load interrupter unit, the insulating bushings or housings therefor being shown in section while the circuit interrupter units are shown in elevation.
Figure 26:
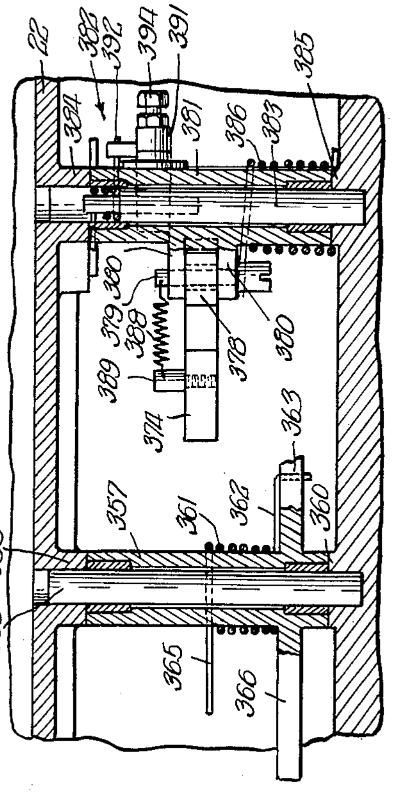
Figure 9:
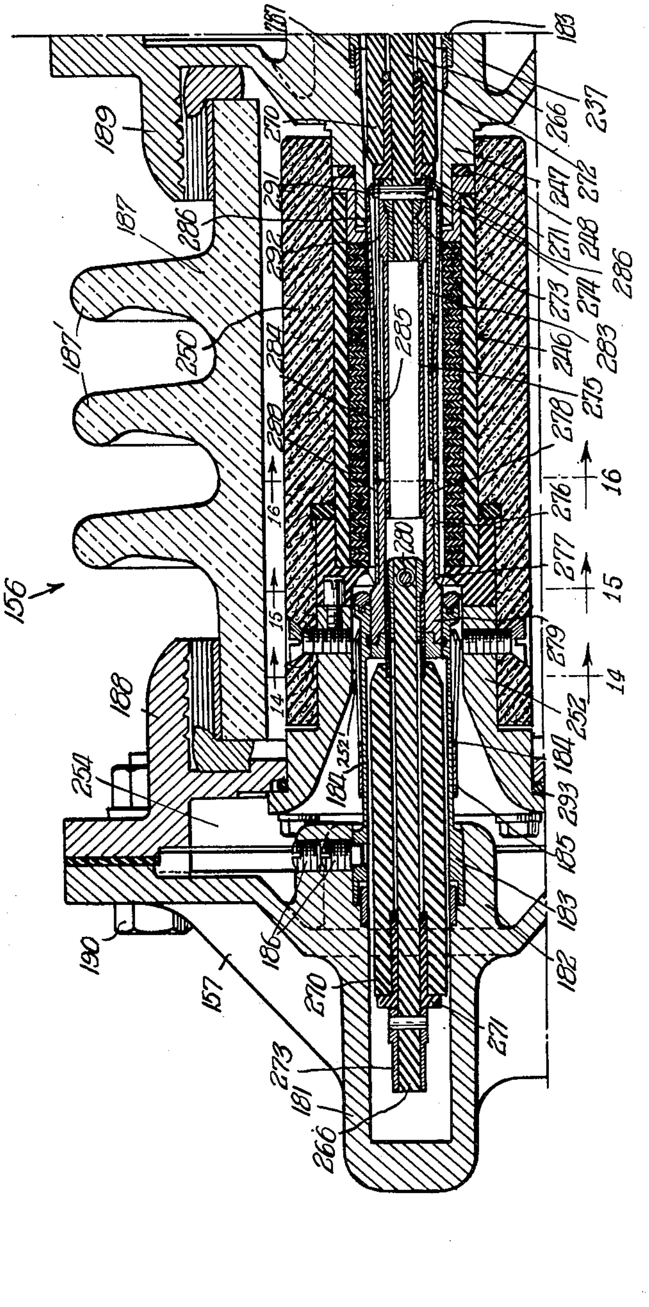
Figure 10:
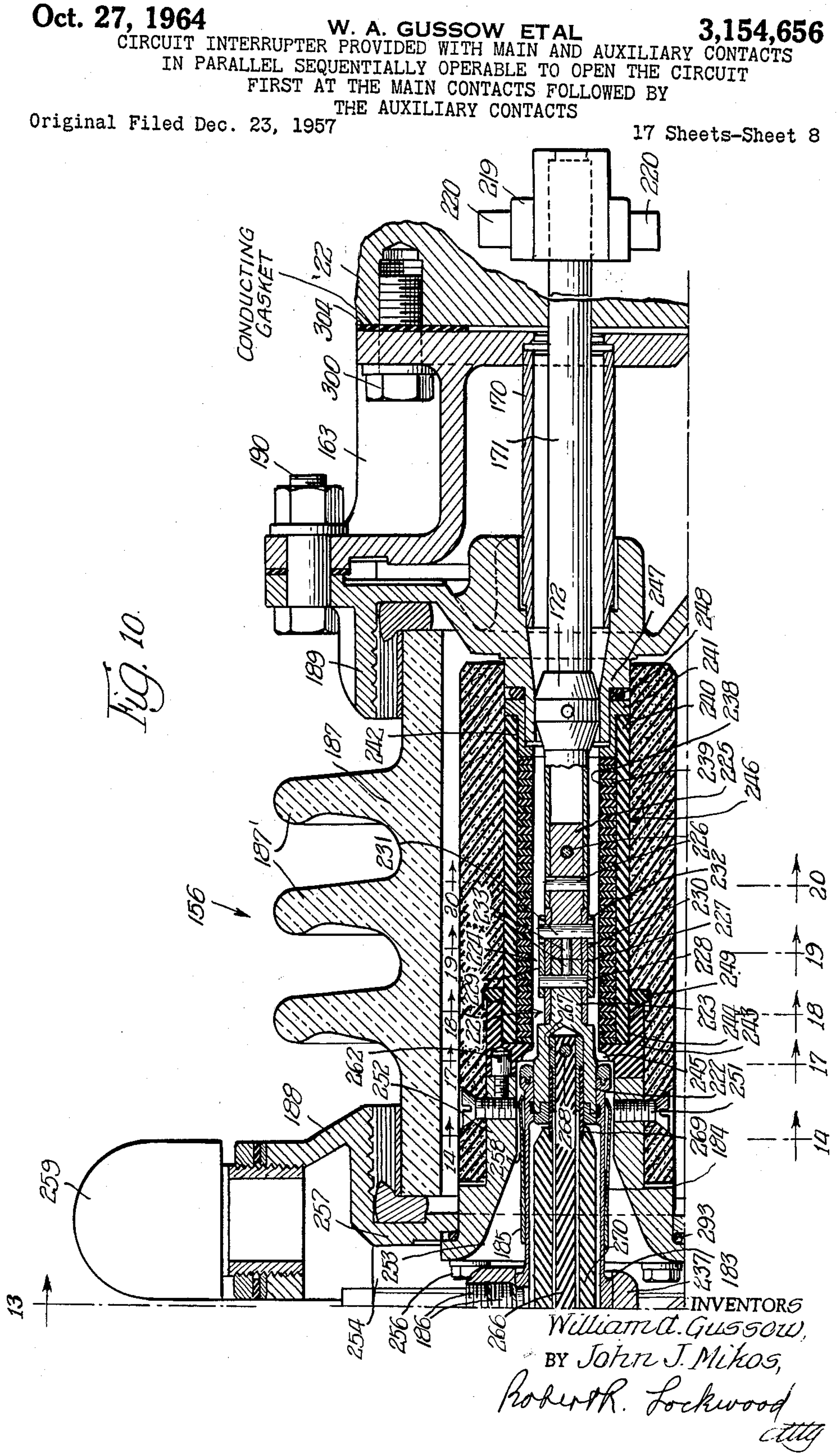
Figure 11:
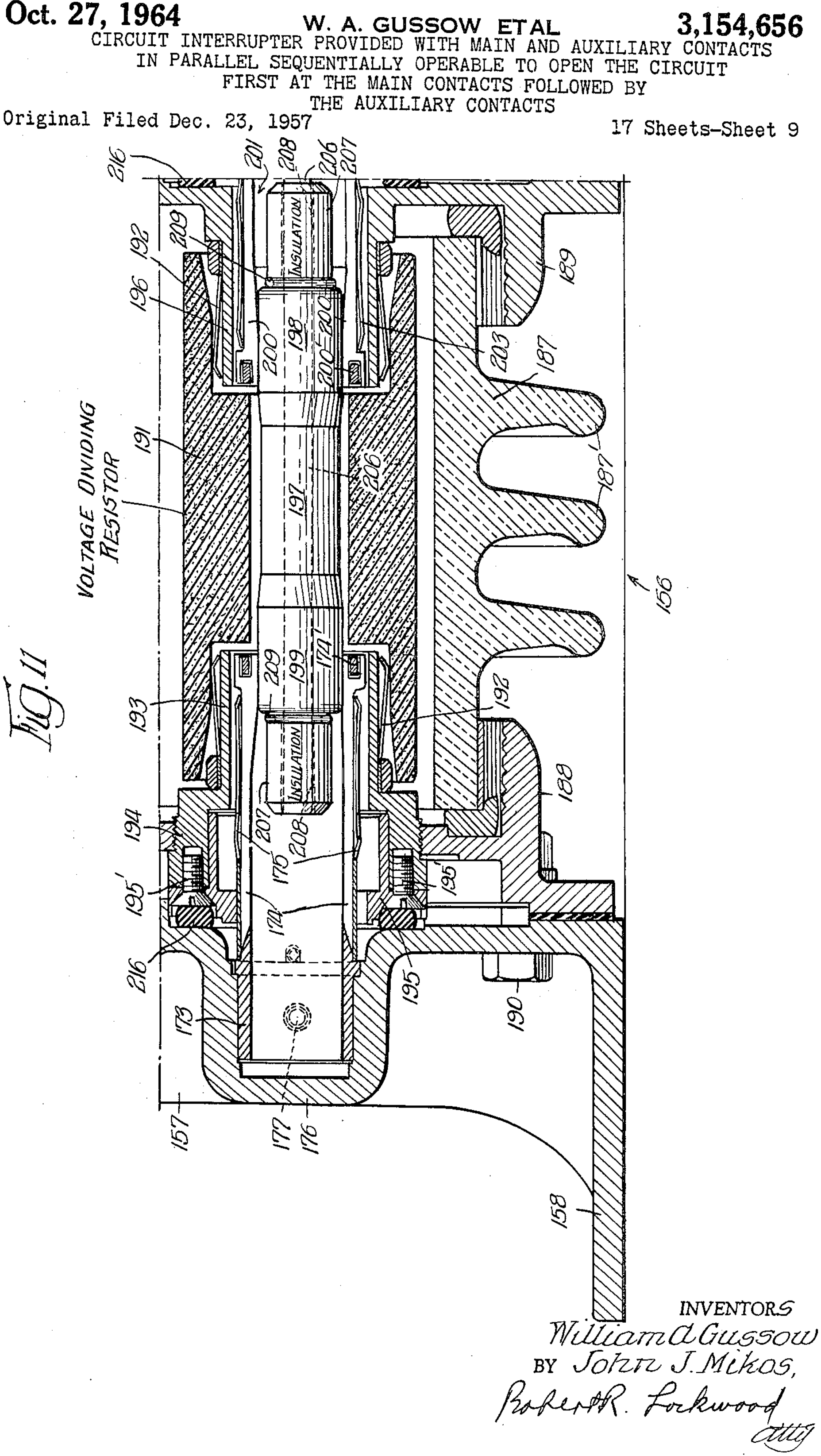
Figure 12:
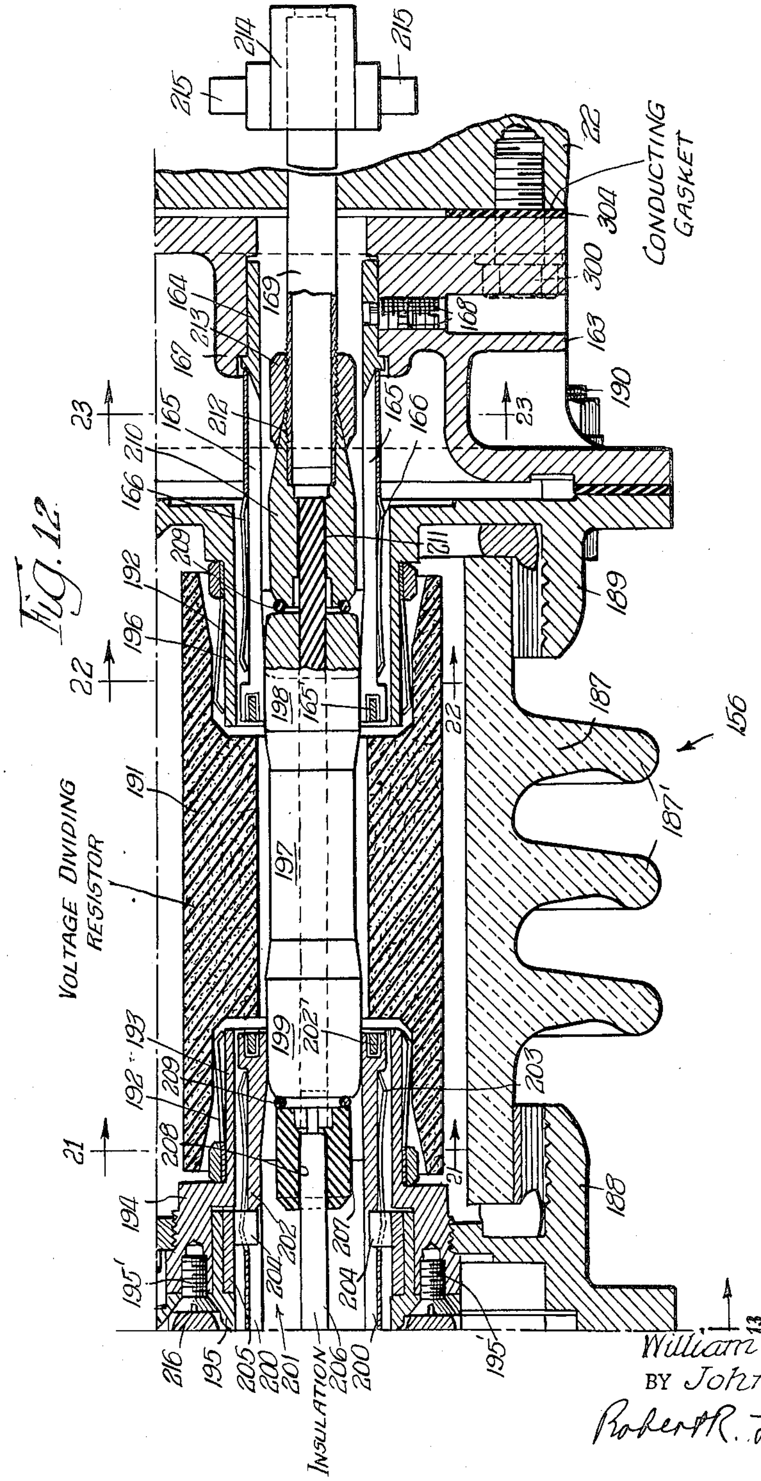
Figure 13:
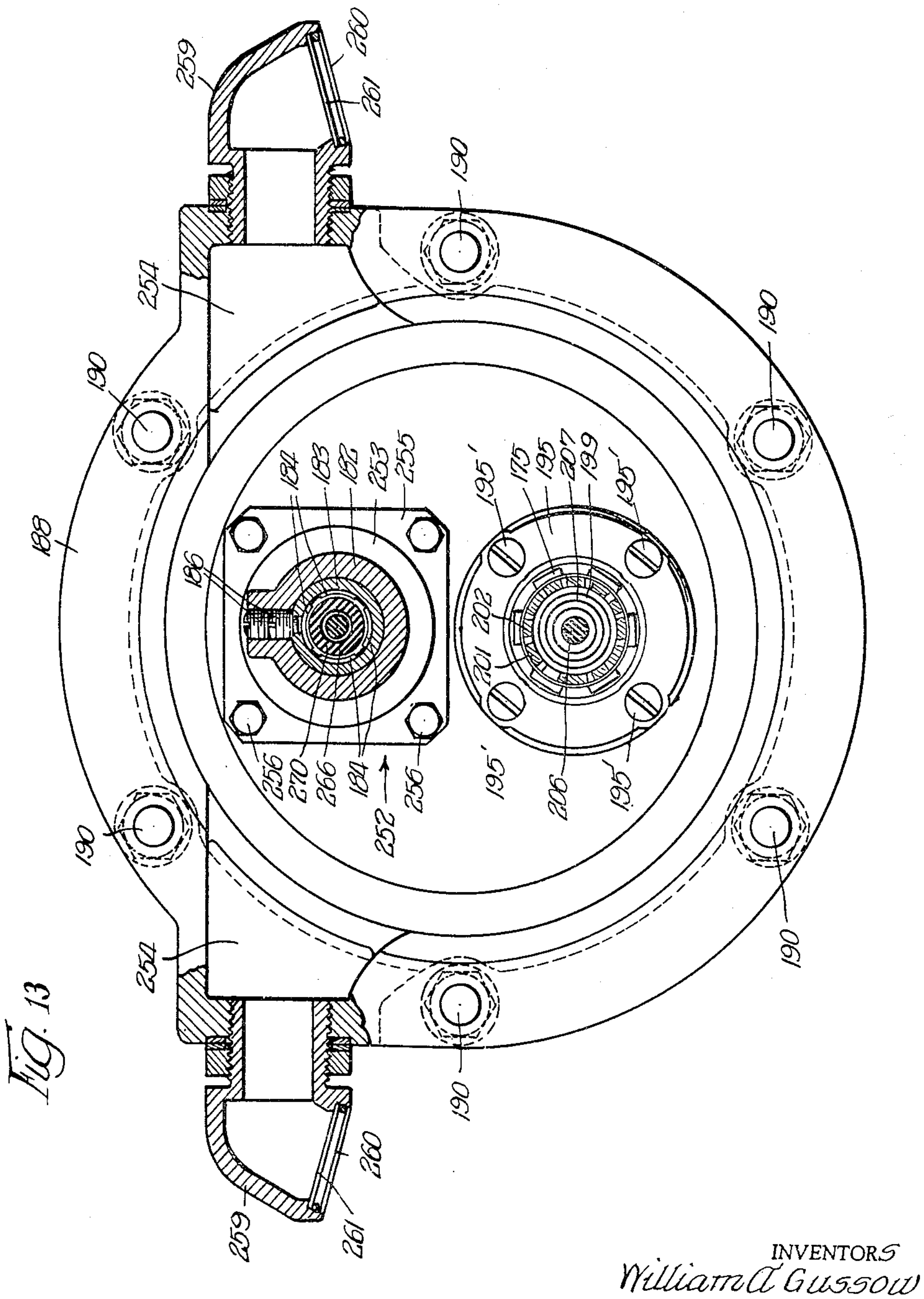
Figures 14, 15, 16, 17, 18:
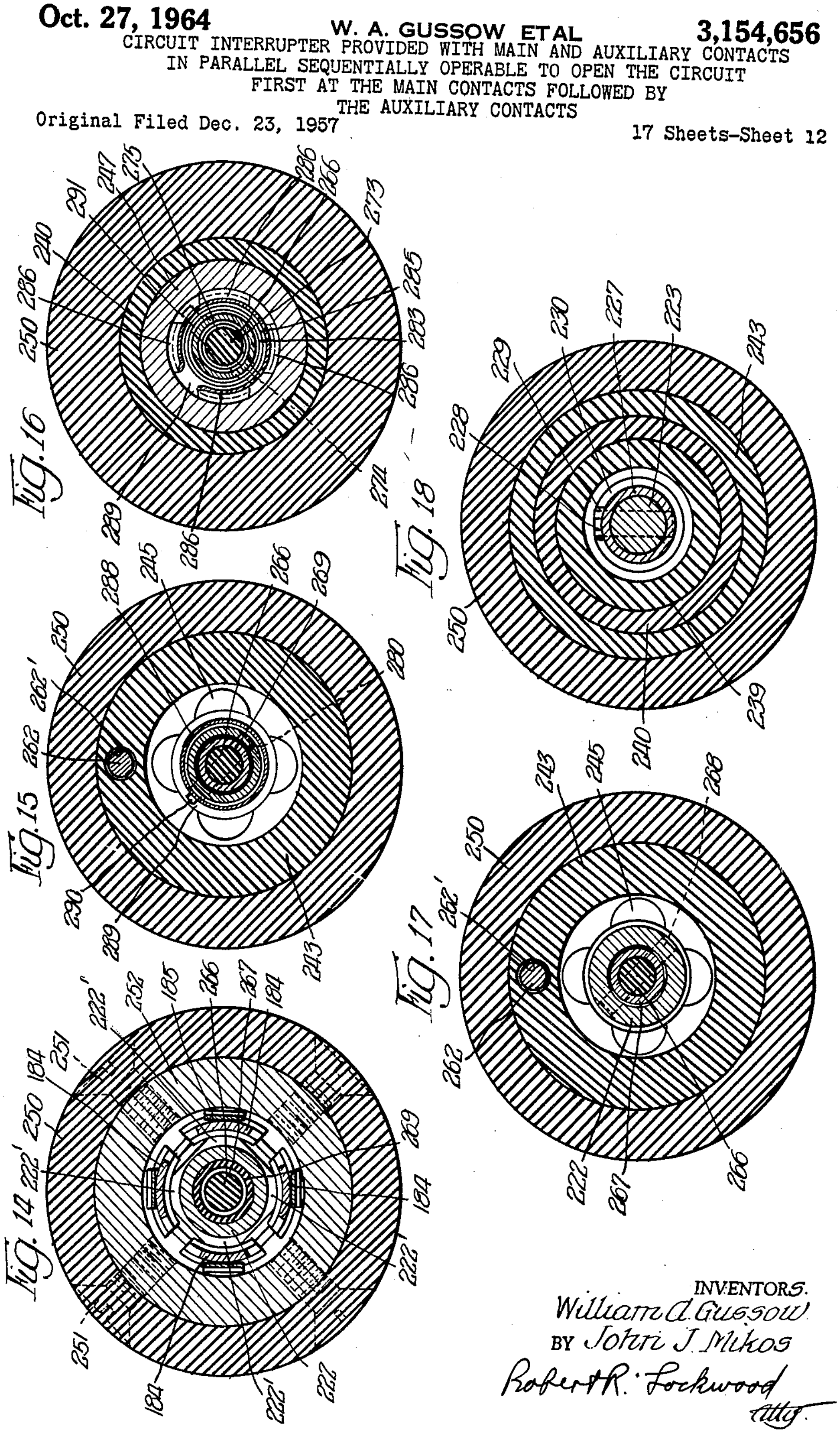
Figures 19, 20, 21, 22, 23:
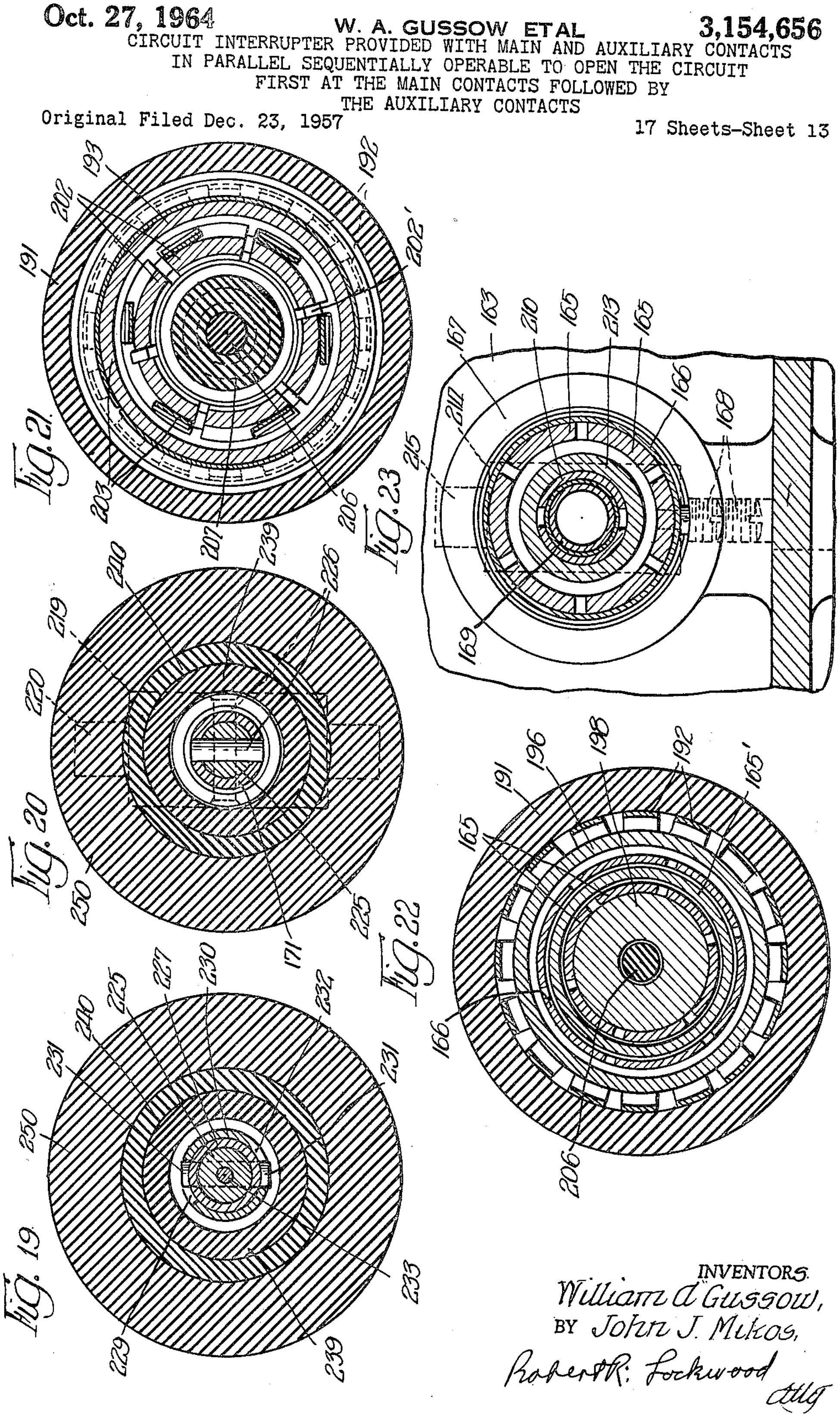
Figure 24:
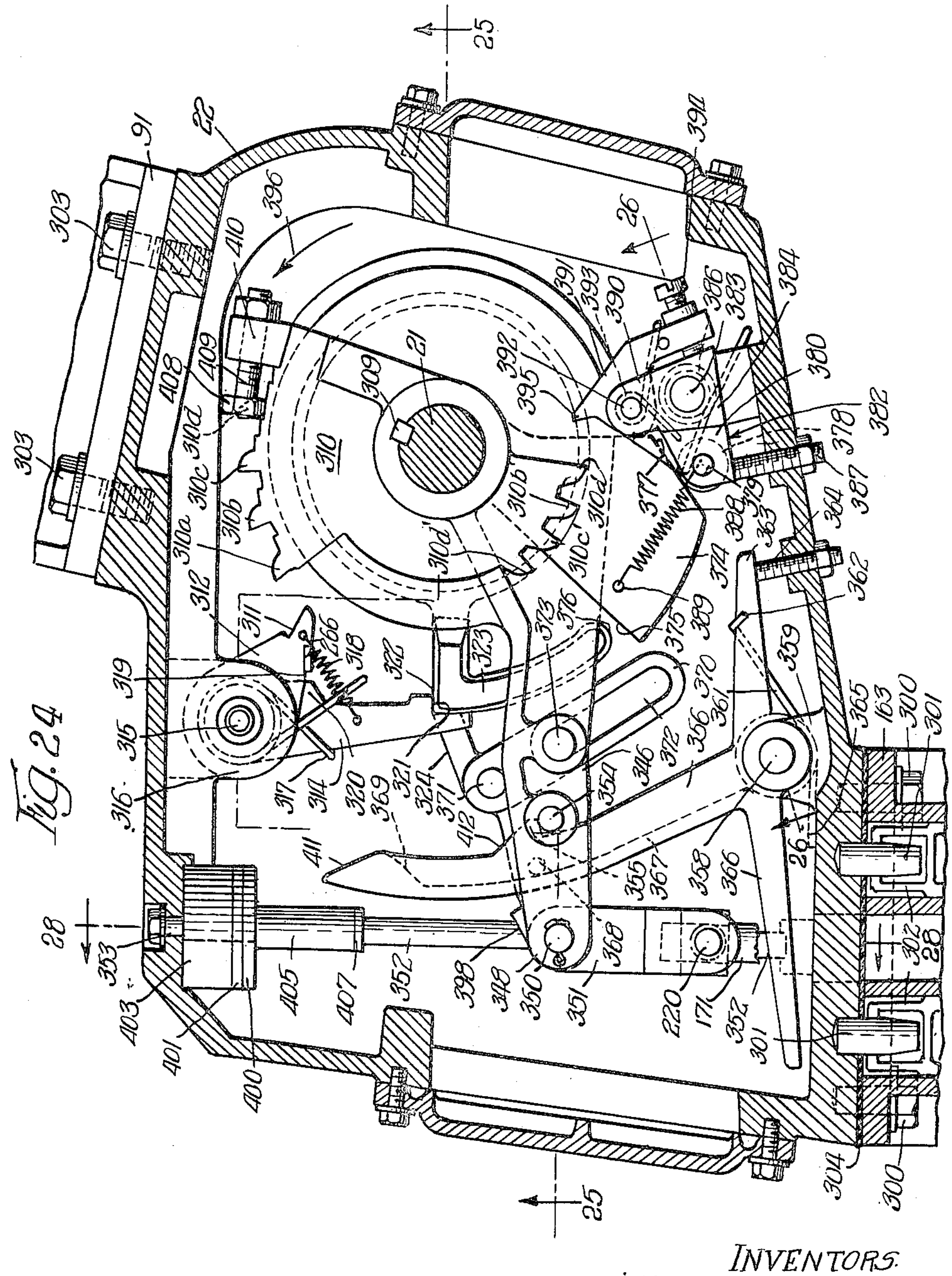
Figure 25:
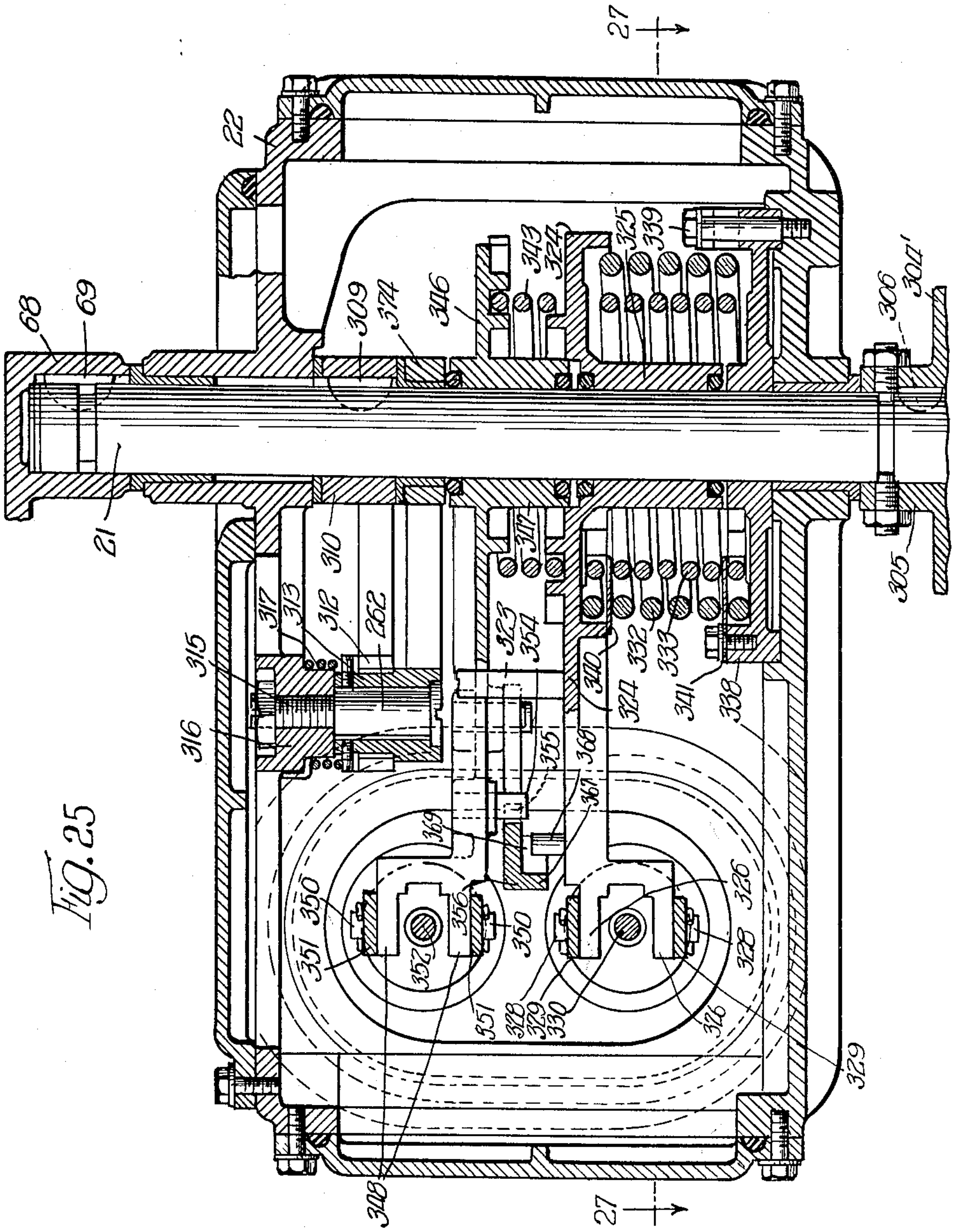
Figure 27:
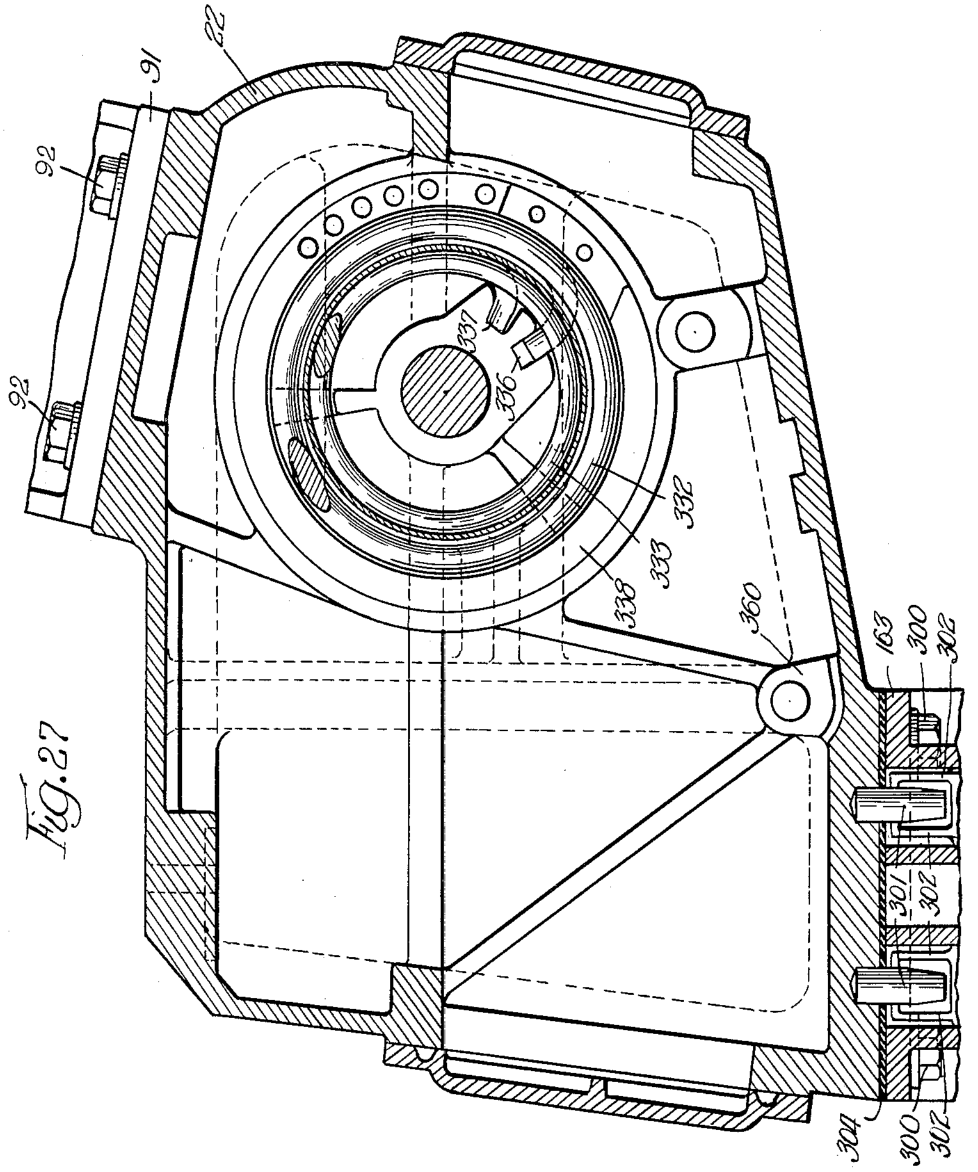
Figure 28:
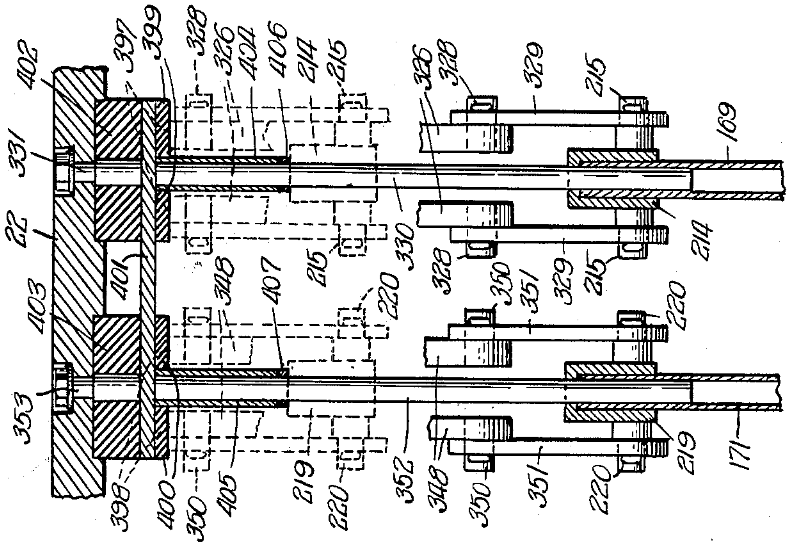

FIGS. 9, 10, 11 and 12 show a vertical sectional view through the load interrupter which is provided with two units, the showing is at an enlarged scale as compared to the showing in FIG. 8 and certain of the parts are shown for illustrative purposes as being in the plane of the section when, as a matter of fact, they are inclined to this plane as will be apparent from the succeeding sectional views (FIG. 10 should be placed to the right of FIG. 9, FIG. 11 should be placed underneath FIG. 9 and FIG. 12 should be placed underneath FIG. 10);

FIG. 13 is a vertical sectional view taken generally along the line 13—13 of FIGS. 10 and 12;

FIGS. 14, 15 and 16 are vertical sectional views taken generally along the lines 14—14, 15—15 and 16—16 of FIG. 9;

FIG. 14 is also a vertical sectional view taken generally along the line 14—14 of FIG. 20;

FIGS. 17, 18, 19 and 20 are vertical sectional views taken generally along the lines 17—17, 18—18, 19—19 and 20—20, respectively, of FIG. 10;

FIGS. 21, 22 and 23 are vertical sectional views taken generally along the lines 21—21, 22—22 and 23—23, respectively, of FIG. 12;

FIG. 24 is a top plan view of the operating mechanism, the cover for its housing having been removed, and the parts being shown in the position corresponding to the closed position of the switch blade with the contacts of the load interrupter in closed position and the operating spring mechanism cocked;

FIG. 25 is a vertical sectional view taken generally along the line 25—25 of FIG. 24;

FIG. 26 is a partial vertical sectional view taken generally along the line 26—26 of FIG. 24;

FIG. 27 is a horizontal sectional view taken generally along the line 27—27 of FIG. 25 and shows the lower portion of the mechanism housing, the operating spring base and the operating spring mechanism which includes inner and outer springs; and FIG. 28 is a vertical sectional view taken generally along the line 28—28 of FIG. 24 and showing by full lines the positions of the cross head when the main and auxiliary contacts of the load interrupter are closed and by broken lines the positions of the cross heads when these contacts are in the open position.

Figures 1, 2:
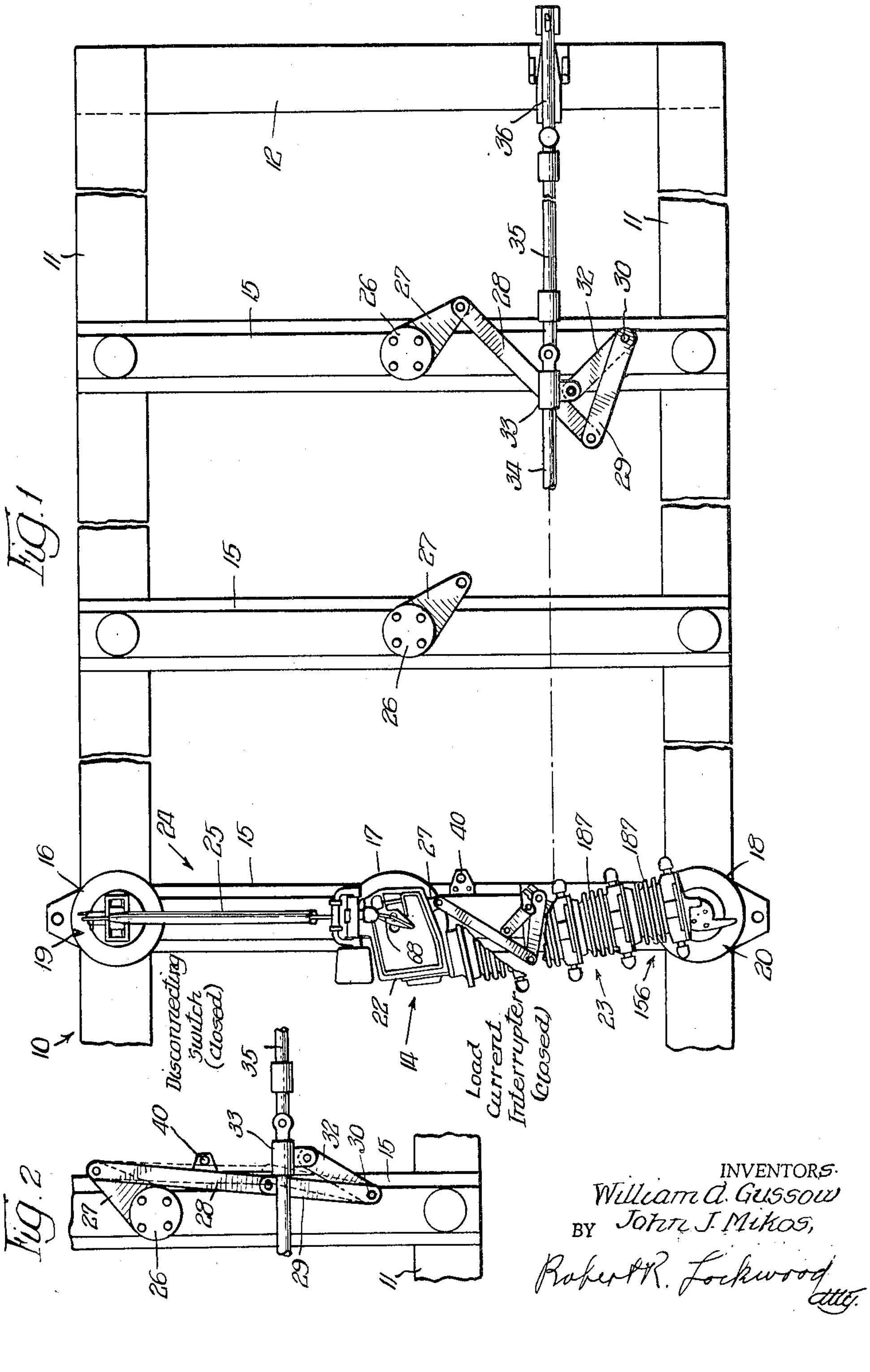
FIG. 2 is a top plan view of the operating linkage that is associated with each of the poles, the linkage being shown in the position corresponding to the open position of the disconnecting switch blade.
Figure 3:
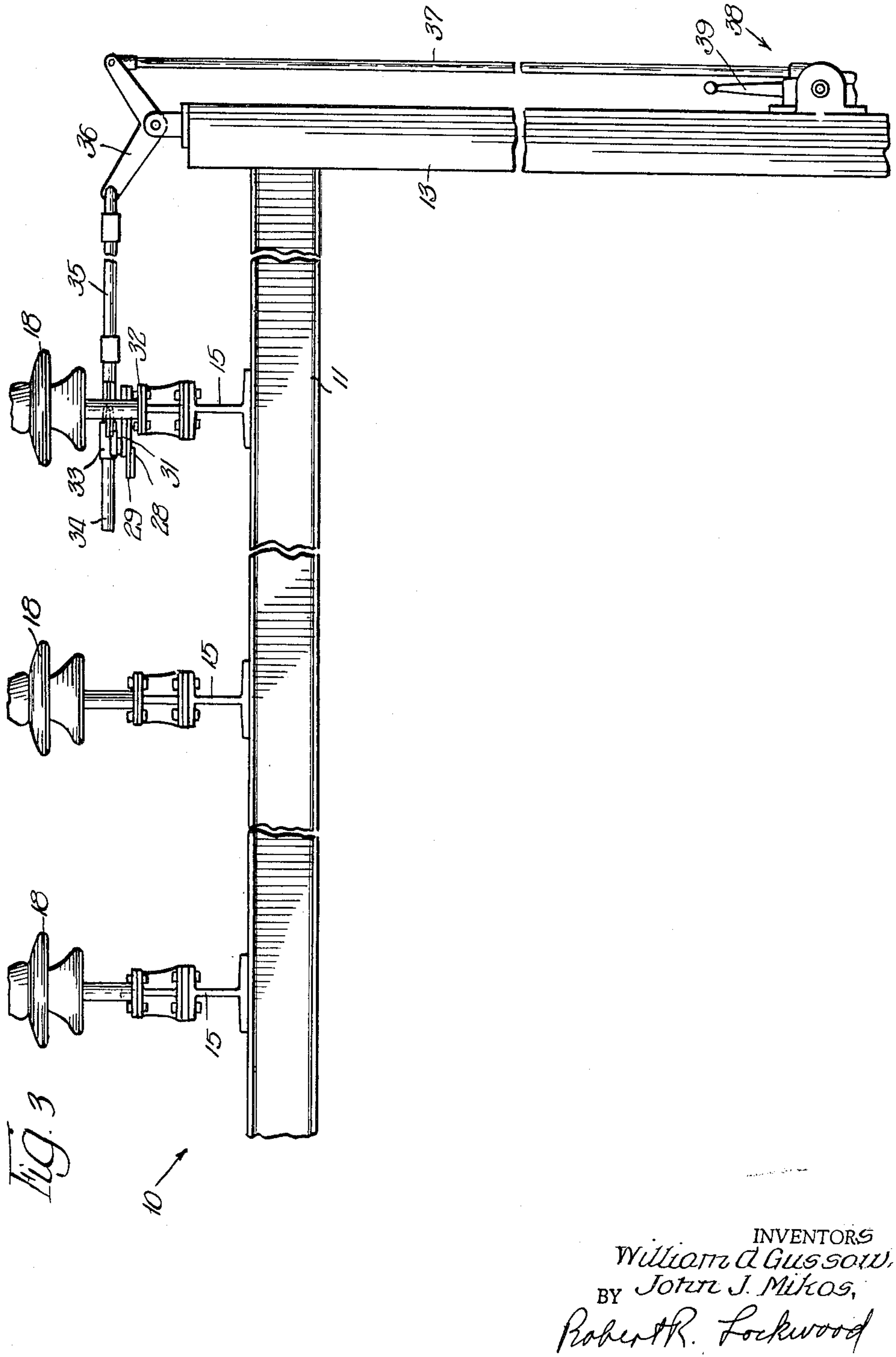
FIG. 3 is a view, in side elevation, of the structure shown in FIG. 1, only portions of the nearest insulators being shown.
Figures 4, 5:
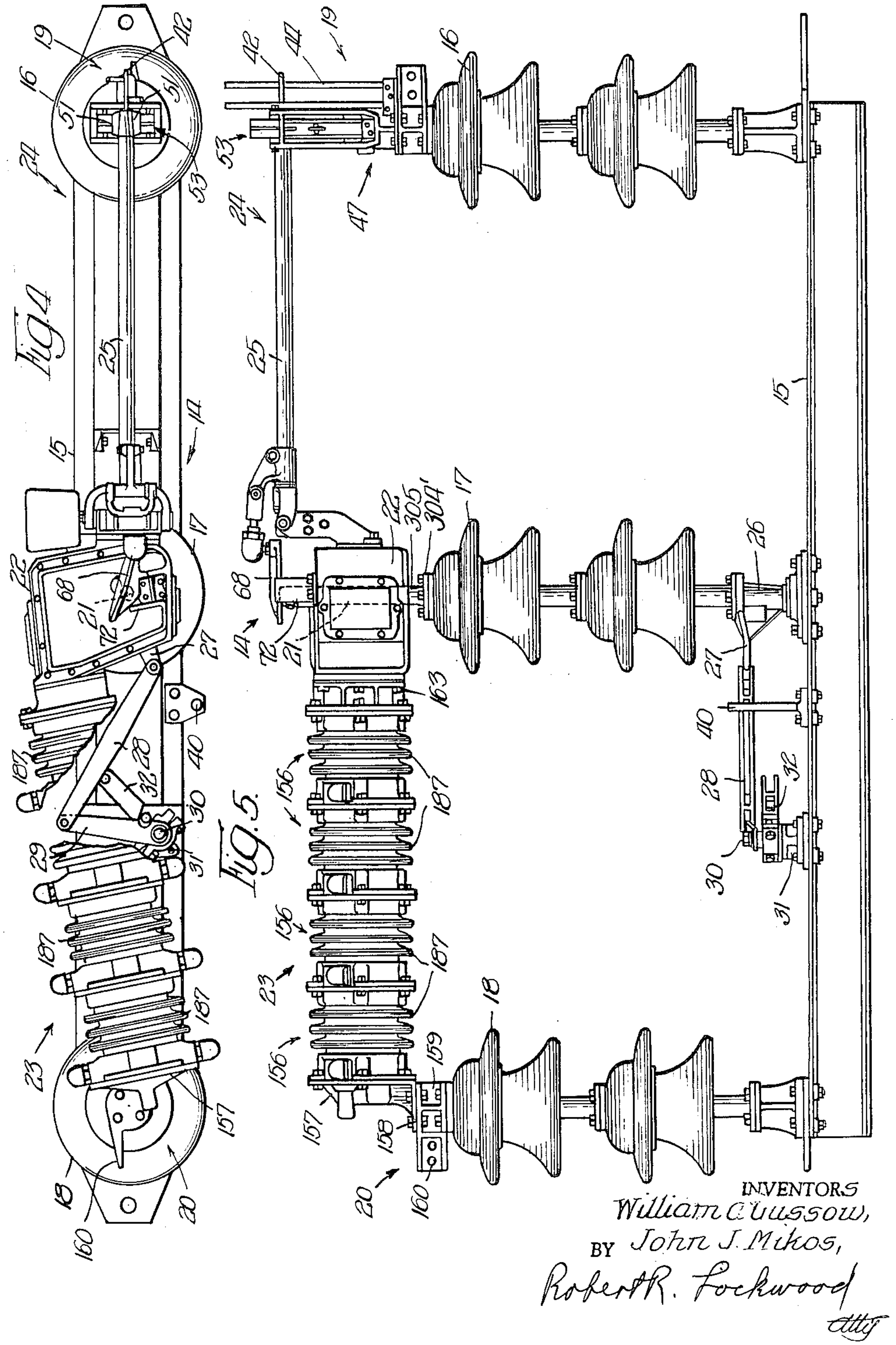
FIG. 4 is a top plan view of the switch means in FIG. 2, the illustration being at a larger scale.
FIG. 5 is a view, in side elevation, of the switch means shown in FIG. 4.

Reference will be had first to FIGS. 1–5 of the drawings. The reference character 10 designates, generally, a switch support structure which may include longitudinal members 11, cross members 12 (only one being shown), and vertical members 13 all of which constitute a suitable support for gang operated switch means such as the switch means, shown generally at 14, in which the present invention is embodied. It will be understood that the present invention is employed in conjunction with a high voltage three phase alternating current power distribution system. For illustrative purposes it is pointed out that the system may be operated at a voltage of 69 kv. However, other voltages can be used with appropriate changes in design as will be understood readily. In FIGS. 1, 4 and 5 the switch means 14 comprises one of the poles of the three pole switch and provision is made, as will appear hereinafter, for simultaneously operating each switch means 14 in order to interrupt each phase of the circuit simultaneously while load current flows therein. Since the switch means 14 for each phase is the same, only one is illustrated and described in detail herein.

Each switch means 14 includes a base 15 which is supported at its ends on the longitudinal members 11. The spacing between the bases 15 depends upon the voltage of the system. First, second and third insulators 16, 17 and 18 are mounted on the base 15 for each switch means 14. The first and third insulators 16 and 18 are stationary while the intermediate second insulator 17 is rotatably mounted. A line contact member, shown generally at 19, is stationarily mounted on the first insulator 16. The details of construction of the line terminals 19 are set forth in the patent above referred to. A line terminal, shown generally at 20, is stationarily mounted on the third insulator 18. It will be understood that the line conductors are connected to the line contact member 19 and to the line terminal 20.

Rotatable with the second insulator 17 is a shaft 21 which projects upwardly through a metallic housing 22 that is held stationary with respect to the second insulator 17 and constitutes a terminal intermediate the line contact member 19 and the line terminal 20. One end of a load current interrupter, shown generally at 23, is secured to one side of the housing 22 while its other end is secured to the line terminal 20. In series with the load current interrupter 23 is a disconnecting switch that is shown generally at 24. It includes a switch blade 25 which is rotatably mounted on the housing 22 and also is mounted, as will be described hereinafter, to rotate about its longitudinal axis for high pressure contact engagement with the line contact member 19 which forms the stationary part of the disconnecting switch 24.

The switch means 14 is shown in the closed position in FIGS. 1, 4 and 5 of the drawings. In this position the load current interrupter 23 is closed and the disconnecting switch 24 is closed. In accordance with this invention provision is made for opening the circuit first by means of the load current interrupter 23. This is effected during the initial portion of the rotation of the second insulator 17 from a position corresponding to the switch closed position to its position which corresponds to the switch open position. When starting to open the switch means 14, rotation of the second insulator 17 through a small arc effects rotation of the switch blade 25 about its longitudinal axis but, before it separates from the line contact member 19, the circuit has been interrupted and current ceases to flow as the result of operation of the load current interrupter 23. On continued rotation of the second insulator 17, the switch blade 25 is swung to the open position which is slightly more than 90° away from the horizontal position shown in the drawings. During the movement of the switch blade 25 to the open position, which is essentially a vertical upright position, the spring which is released on initial movement of the second insulator 17 for operating the load current interrupter 23 is recocked and the contacts of the load current interrupter 23 are reclosed. When the second insulator 17 is rotated in the opposite direction, the only function performed thereby is the swinging of the switch blade 25 from the vertical position to the horizontal switch closed position terminating in a rotation of the switch blade 25 about its longitudinal axis to move it into high pressure contact engagement with the line contact member 19. The circuit is completed between the switch blade 25 and the line contact member 19 since the load current interrupter 23 is closed.

Once the operator has begun the sequence for opening the contacts of the load current interrupter 23 and swinging of the switch blade 25 to the open position, provision is made, as described hereinafter, for preventing a reverse movement of the second insulator 17 until the switch blade 25 has been swung to the full open position accompanied by the reclosure of the contacts in the load current interrupter 23 and recocking of its operating spring.

On operation toward reclosure of the circuit, should the operator decide to reopen the switch blade 25 of each switch means 14 after he has moved it into close proximity with the line contact member 19, he can do so. However, the operating mechanism is so arranged that the switch blade 25, under these circumstances, must be returned to the full open position and at the same time the contacts of the load current interrupter 23 are opened and subsequently closed and the operating spring mechanism therefor recocked during the final portion of the movement of the switch blade 25 to the open circuit position.

The contacts of the load interrupter 23 are reclosed only after adequate disconnect distance has been established between the line contact member 19 and the switch blade 25 and after the switch blade is open to prevent the flow of leakage current across the gaps of the interrupter units due to normal frequency voltage or to the surge voltages that may be present where the line contact member 19 is connected to an energized line. Since the contacts of the load interrupter 23 are closed when the switch blade 25 is swung to closed position, the switch blade 25 closes against a fault if such should exist. This prevents damage to the load interrupter 23 by large fault making currents which can be carried but not interrupted by it.

Should the operator swing the switch blade 25 into close proximity with line contact member 19 and then decide not to complete the closure of the switch because of encounter with ice or other mechanical obstruction or for other reasons, on reversal of movement of the switch blade 25, the load interrupter 23 is opened. This prevents the formation of a large unconfined arc. When an arc is drawn under these circumstances, the current flow therethrough is interrupted by the load interrupter 23 before a large arc can form and get out of control. As will presently appear, a number of tripping points are provided which permit reversal of closing movement of the switch blade 25. This gives the operator considerable latitude in operation and permits him to decide when the switch blade 25 is close enough to cause an arc to strike to the line contact member 19, or to permit interruption should the switch blade 25 be touching arcing tips (to be described), or to permit interruption because the switch blade 25 is not fully seated as may be the case where ice is involved. Also the operator can proceed from a fully closed switch position.

In FIG. 1 it will be noted that a rotatable fitting 26 is provided on which each insulator 17 is carried and by means of which it is rotated to effect the sequence of operations just outlined. Extending from each rotatable fitting 26 is an arm 27 to the outer end of which one end of a link 28 is pivotally connected. The other end of the link 28 is pivotally connected to a link 29 which is secured to a shaft 30 that is journaled in a bearing 31 which is mounted on the respective base 15. Also fastened to the shaft 30 is an arm 32 which is pivoted to a fitting 33 that is fast on an interphase rod 34 common to the three switch means 14. The arm 32 is clamped to the shaft 30 and thereby it can be adjusted readily in relation to the link 29 to accommodate variation in the spacing between the switch means 14 and other dimensions and clearances of the entire assembly to the end that the positioning of the interphase rod 34 is not critical. The lengths of the links 28 and 29 and of the arm 32 are such and they are so related that the effort of the operator in opening the several switch means 14 is expended at maximum mechanical advantage during the cycle of operation when the load is the greatest.

Any suitable means can be employed for moving the interphase rod 34 from one position to the other in order to rotate the second insulators 17 between the closed and open position of the respective switch means 14. The operating means provided for moving the interphase rods 34 should be such as to require that a complete cycle of operation be effected after a switch opening operation has been initiated. The interphase rod 34 is operated through the agency of a rod 35 which is pivotally connected to one arm of a bell crank 36 while the other end, as shown in FIG. 3 of the drawings, is connected by a vertical rod 37 to an operator, shown generally at 38, of the ratchet type which includes an operating handle member 39 for manual operation by a lineman. The details of construction of the operator 38 are set forth in the patent above referred to.

When the switch blade 25 has been operated to the full open position the links 28 and 29 are moved past the center position shown by full lines in FIG. 2 to their overcenter position, shown by broken lines, where further movement is prevented by a toggle stop 40 carried by the respective base 15. This toggle arrangement provides sufficient leeway to accommodate maladjustment of the various components and insures that each load interrupter 23 fully latches without requiring critical adjustment of the operating linkages.

It will be recalled that the switch blade 25, in the switch closed position, makes contact with the line contact member 19. The switch blade 25 is provided at its outer end with an arcing tip 42 which is arranged to provide the initial and final contact engagement between the switch blade 25 and the line contact member 19. The arcing tip 42 constitutes an endwise extension of the switch blade 25 and can be readily removed and replaced should it become eroded due to arcing. It is arranged to engage and disengage flexible arcing horns 43 and 44 having circular cross sections which are secured in staggered relation to a base portion of a contact housing member which is shown, generally, at 47. It will be noted that the arcing horns 43 and 44 are spaced apart along the arcing tip 42 a distance several times the transverse dimension or diameter of the arcing horns 43 and 44. The housing member 47 is arranged to be mounted on the first insulator 16 as is shown more clearly in FIG. 5 of the drawings.

It is desirable that the switch blade 25 have high pressure contact engagement with the line contact member 19. The reason for this is to improve the current carrying capacity and reduce heating. For this purpose the switch blade 25 at its swinging end is provided with laterally extending ears 51 that are arranged to be rotated on rotation of the switch blade 25 about its longitudinal axis into and out of high pressure contact engagement with downturned bifurcated inner branches of inverted generally U-shaped contact members 53 that are formed preferably of copper and have substantial inherent resiliency.

Any suitable means can be employed for effecting the twisting of the switch blade 25 about its longitudinal axis to relieve the high pressure contact engagement with the line contact member 19 and subsequent swinging of the switch blade 25 to the vertical open position by rotation of the shaft 21 together with the rotation of the second insulator 17. For example, the operating mechanism disclosed in Gussow application Serial No. 417,655, filed May 22, 1954, now Patent No. 2,818,474, issued December 31, 1957, can be employed.

Figure 6:
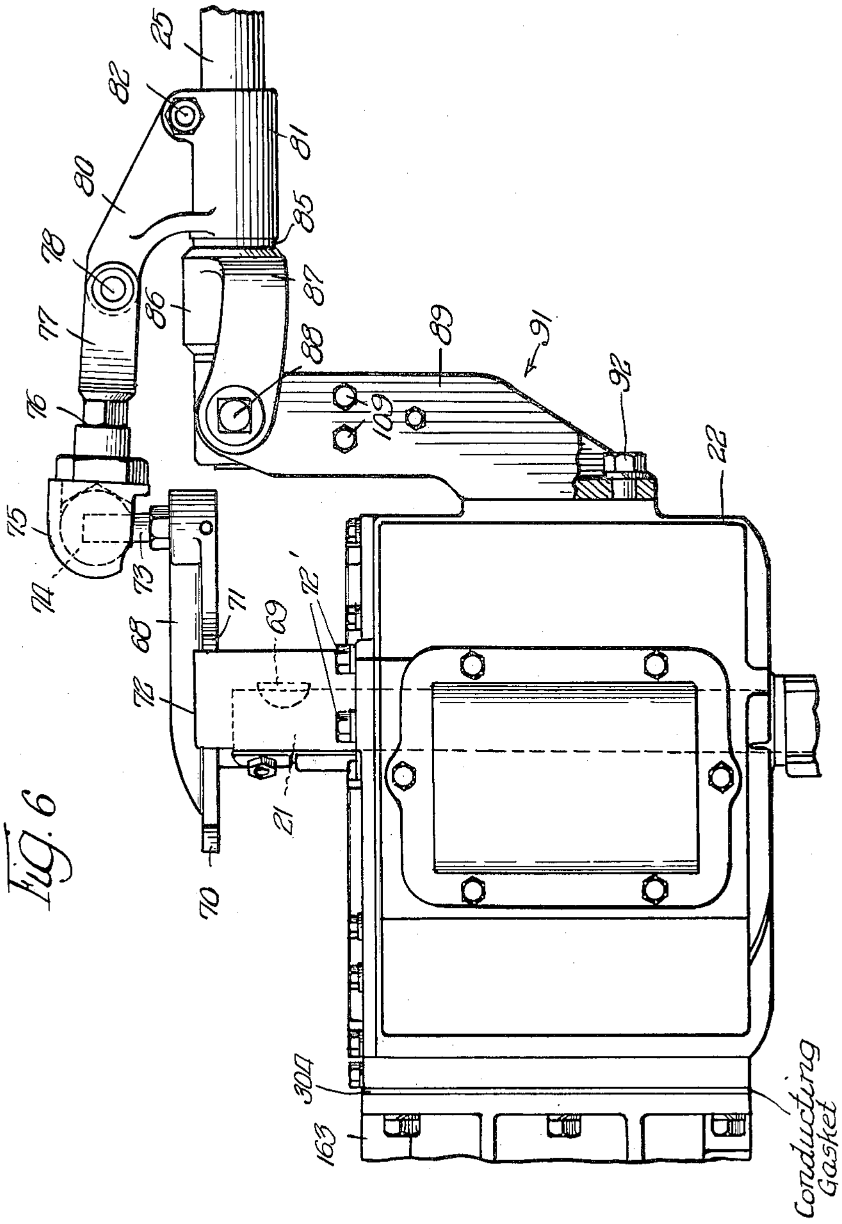
FIG. 6 is a view, in side elevation and at an enlarged scale, of the hinge end of the switch blade, showing a portion of the switch contact mounted thereon and the mechanism housing.
Figure 7:
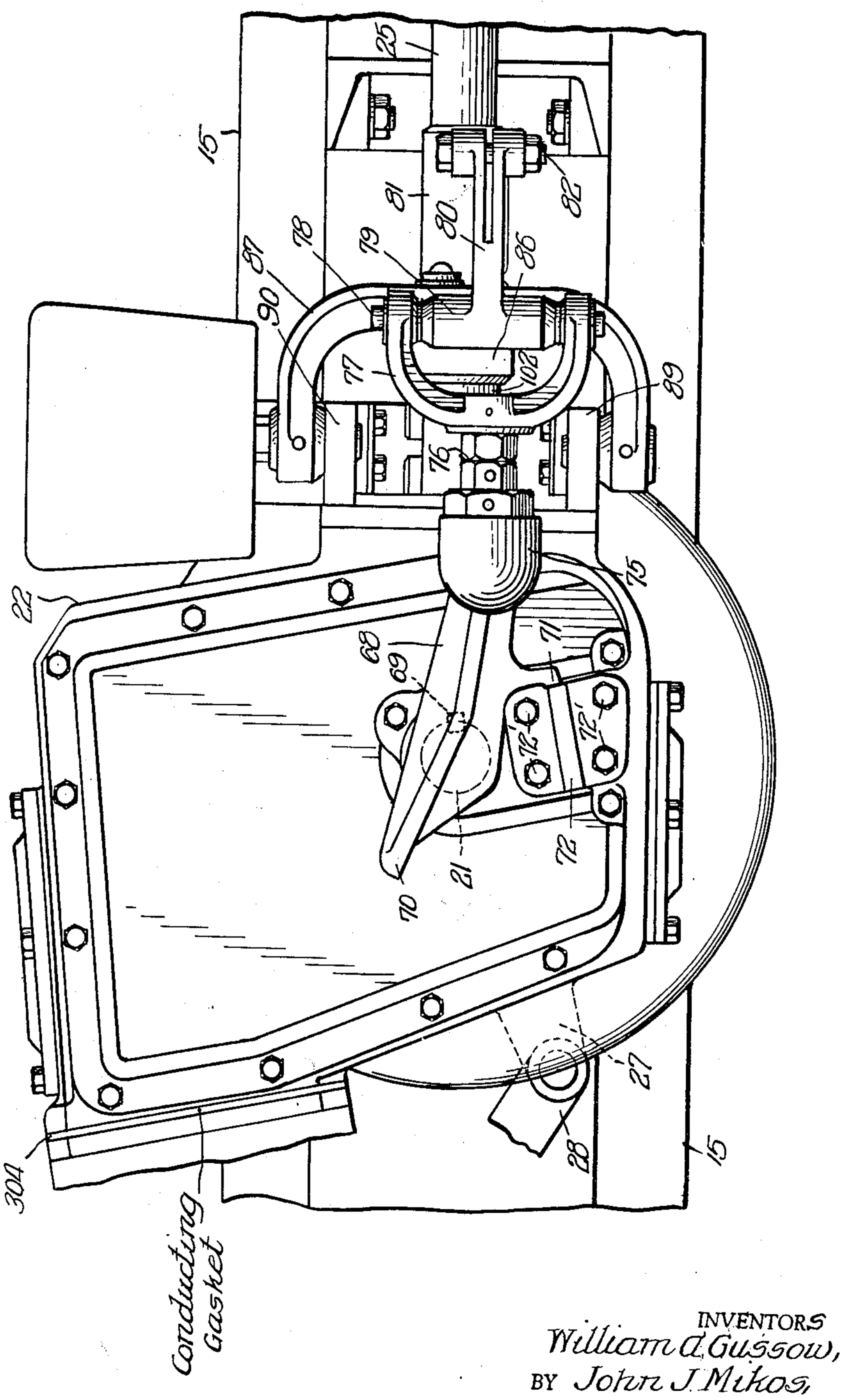
FIG. 7 is a top plan view of the construction shown in FIG. 6.

In FIGS. 6 and 7 of the drawings a suitable mechanism for interconnecting the shaft 21 and switch blade 25 is illustrated. It includes a switch crank 68 that is non-rotatably secured to the shaft 21 by a key 69. The rotation of the shaft 21 is limited to about 100° by stop shoulders 70 and 71. In the closed position of the switch blade 25, as shown in FIG. 7, the stop shoulder 71 is in engagement with one side of a stop 72 that is secured in position on the mechanism housing 22 by bolts 72'. In the open position of the switch blade 25, the stop shoulder 70 engages the opposite side of the stop 72. In this manner the rotation of the shaft 21 is limited through the cooperation of the stop shoulders 70 and 71 with the stop 72 and the arrangement is such that the switch blade 25 is rotated about its longitudinal axis and swung to the open position while the switch crank 68 is moving from the position shown in FIG. 7 of the drawings to a position in which the stop shoulder 70 engages the stop 72. During this movement of the shaft 21, the mechanism within the mechanism housing 22 functions, as will be described in detail hereinafter, first to effect the interruption of the circuit by operation of the load current interrupter 23 before the switch blade 25 disengages the line contact member 19 and then, during the latter part of the movement of the shaft 21, the contacts of the load current interrupter 23 are reclosed and its operating spring mechanism is recocked. By the time that the stop shoulder 70 engages the stop 72 and further movement is prevented, the switch blade 25 has been swung slightly past the vertical upright position, the contacts of the load current interrupter 23 have been reclosed and its spring has been recocked. During the reverse movement of the switch crank 68, the only operation effected is the swinging of the switch blade 25 from the vertical upright position to the switch closed position where the circuit is completed between the arcing tip 42 and the arcing horns 43 and 44, followed by engagement of the lateral ears 51 of the switch blade 25 with the inner branches 52 of the contact members 53.

The rotary movement of the switch crank 68 is transmitted to the switch blade 25 through a pin 73 which stands upwardly from the switch crank 68 and carries at its upper end a ball 74 which fits in a socket 75 to which a link 76 is connected that carries at its other end a clevis 77. The arms of the clevis 77 are pivotally connected to a pin 78 to a head 79 that is formed integrally with an arm 80 which is provided with a clamp portion 81 that surrounds the hinge end of the switch blade 25 and is secured in good contact engagement therewith by a clamp bolt 82.

The rotation of the switch crank 68 through approximately 100° not only effects the turning of the switch blade 25 about its longitudinal axis but also causes it to be swung between the horizontal closed position and the vertical open position. To accommodate this compound movement of the switch blade 25, the clamp portion 81 is provided with a rearwardly extending hub portion 85 that is journaled in a bearing 86 which is located on a blade carrier 87 which is pivoted to swing about a horizontal axis 88 in upstanding arms 89 and 90 of a bracket 91 which is secured to the mechanism housing 22 by bolts 92. It will be understood that the bearing 86 provides for the rotation of the switch blade 25 about its longitudinal axis while the blade carrier 87 reacts to swing the switch blade 25 from the horizontal to the vertical position. This compound movement of the switch blade 25 is effected through the rotation of the switch crank 68 that is connected, as described, through the pin 73 to ball 74 in socket 75 and thereby to the pin 78 which is coupled to the arm 80 that is clamped to the switch blade 25.

FIGS. 8–23 show in more detail the construction of the load current interrupter 23. In general this interrupter comprises series connected main and auxiliary contact members which are connected in parallel circuit relation. The main contact members are arranged to carry the load current and to withstand the flow of short circuit current. Provision is made for opening the main contacts first, followed by opening of the auxiliary contacts where arcs are drawn in series and extinguished. The movable contacts of the main contact assembly necessarily are substantially heavier than the movable contacts of the auxiliary contact assembly. Provision is made for separating the series connected main contacts and transferring the current flow to the series connected auxiliary contacts which subsequently are opened as a result of applying thereto not only the biasing action of the operating spring mechanism but also a portion of the kinetic energy imparted to the movable main contacts while they are moving from the closed to the open position.

As illustrated in FIG. 8 the load current interrupter 23 is made up of a plurality of interrupter units 156. The number of interrupter units 156 used depends upon the voltage of the circuit in which the switch means 14 is connected. For example, if the circuit voltage is 34.5 kv., two interrupter units 156, constructed as herein described, can be used. For a circuit operating at a voltage of 69 kv., four of the interrupter units 156 can be used. For higher voltages additional interrupter units 156 can be employed or the interrupting ability of the interrupter units 156 can be increased by hermetically sealing them and filling them with a suitable arc extinguishing gas. The interrupter units 156 are of identical construction except for the unit adjacent the mechanism housing 22. This unit is slightly different in certain respects as will presently appear. By employing this unit construction manufacturing costs are reduced and repair and replacement of parts are facilitated.

At the left hand end of the load current interrupter 23 there is provided a terminal plate 157, FIGS. 5 and 8, which has a flange 158 integrally formed therewith for mounting on an adapter 159 carried by the insulator 18 from which a terminal lug 160 extends to which a line conductor is connected. This construction facilitates removal of the load current interrupter without disturbing the connection of the line conductor to the terminal lug 160. At the other end of the load current interrupter 23 there is provided an adapter or end terminal member 163 which is arranged to mount the other end of the interrupter on the mechanism housing 22.

As shown in FIG. 12 an end stationary main contact 164 is provided within the adapter 163. The main contact 164 includes integral contact fingers 165 which are biased inwardly by the fingers of a surrounding contact spring 166. A ring 165′ limits the inward movement of the contact fingers 165 when they are not engaged by a movable main contact to be described. The main contact 164 is telescoped within a sleeve portion 167 that is cast integrally with the adapter 163 and it is held in place therein by set screws 168. Extending through the adapter 163 is a main contact tubular operating rod 169 the movement of which is controlled by the mechanism within the housing 22 in a manner to be described presently.

Above the sleeve portion 167 of the adapter 163 there is a connecting sleeve 170, FIG. 10, of good conducting material and within it there is slidably mounted an auxiliary contact tubular operating rod 171 which, like the operating rod 169, is controlled by the mechanism within the housing 22. A filler plug 172 is carried by the auxiliary contact operating rod 171 for preventing excessive lateral motion of the rod 171 when it comes to a sudden stop on opening of the interrupter 23 or on closing against the mechanical resistance or friction of auxiliary stationary contacts.

FIG. 11 shows a part of the construction of the load current interrupter 23 at the other end. It will be observed here that an end stationary main contact 173 is provided which corresponds to the main contact 164 previously described. It includes contact fingers 174 which are biased inwardly by the fingers of a contact spring 175. Their inward movement is limited by a ring 174′. The main contact 173 is telescoped in a hollow boss 176 which is cast integrally with the terminal plate 157. A set screw 177 secures the main contact 173 in place in the boss 176.

Above the boss 176 there is another hollow boss 181, FIG. 9, which is formed integrally with the terminal plate 157. Inwardly thereof is an integral sleeve 182 within which is telescoped an end stationary auxiliary contact 183. It includes contact fingers 184 which are biased inwardly by a surrounding contact spring 185. Set screws 186 are threaded radially into the sleeve 182 and serve to hold the end auxiliary contact 183 in place. The arrangement is the same as shown in FIG. 13 although that is a view along the line 13—13 of FIGS. 10 and 12.

It was pointed out hereinbefore that the load current interrupter 23 is made up of a plurality of interrupter units 156. Generally, they are of duplicate construction and a description of one will suffice for all of them. As shown in FIG. 8 each of the interrupter units 156 includes a hollow insulator bushing or housing 187 at the ends of which bushing flanges 188 and 189 are provided. Where the bushing flanges 188 and 189 adjoin, they form an intermediate terminal between the end terminals provided by the terminal plate 157 and the adapter 163. The radial skirts 187′ on the insulator bushings 187 are shaped to permit either horizontal or vertical mounting of the interrupters 23. The bushing flanges 188 and 189 are secured to each other by bolts 190, FIG. 13, intermediate the ends of the load current interrupter 23 and by such bolts to the terminal plate 157 at the left end and the adapter or end terminal member 163 at the right end. The several insulator bushings 187 constitute an insulating housing which is interposed between the mechanism housing 22 and the line terminal 20 for enclosing the main and auxiliary parallel connected contacts.

It is desirable that there be a uniform distribution of the voltage between the terminals of the load interrupter 23 when the contacts thereof are open. Where two units 156 are employed, half the voltage between these terminals should be applied to each unit. For this purpose voltage dividing resistors 191, FIGS. 8, 11 and 12, are employed. They may be cylindrical in shape and formed of semi-conducting material. For example, each may have a resistance of 2 megohms at 10 kv., 60 cycles and be capable of dissipating 50 watts. Instead of a single resistor, a number of parallel connected resistors can be used which provide essentially the same operating characteristics. At one end the resistor 191 is connected by spring contact fingers 192 to a cylindrical flange 193 of a contact socket 194 which is threaded into the respective bushing flange 188. Telescoped with each contact socket 194 is a contact flange member 195 which is secured thereby by screws 195'. At the other end each resistor 191 is connected by another set of spring contact fingers 192 to a cylindrical flange 196 formed integrally with the respective bushing flange 189. It will be apparent that the voltage dividing resistors 191 are connected between the intermediate terminal formed by the juxtaposed bushing flanges 188 and 189 and the end terminals provided by the plate 157 and the adapter 163. When additional units 156 are used, the voltage between the end terminals of the interrupter 23 will be correspondingly divided between them and the intermediate terminals.

The main current carrying contacts include a main movable contact 197 which has cylindrical contact portions 198 and 199 at its ends. As shown in FIGS. 11 and 12 the movable contacts 197 are located within the voltage dividing resistors 191. For the construction shown in FIG. 12, the contact portion 198 engages the contact fingers 165 of the end stationary main contact 164 that is carried by the adapter 163. If the interrupter unit 156 were an intermediate rather than a unit at the right hand end, thte contact portion of such a unit would engage contact fingers 200, FIG. 11, at the left end of an intermediate stationary main contact, shown generally at 201 which, as shown in FIG. 12, has contact fingers 202 that engage the contact portion 199 at the left end of the main movable contact 197 of the unit 156 shown in FIG. 12. The contact fingers 200 and 202 may be each 6 in number with the former being offset from the latter 30°. The contact fingers 200 and 202 are biased into good contact engagement with the contact portion 199 by fingers of a surrounding contact spring 203. Rings 200' and 202' limit the inward movement of the contact fingers 200 and 202, respectively, in the absence of the contact portions 198 and 199. The intermediate stationary main contact 201 and its surrounding contact spring 203 are loosely mounted within the flange 193 and socket 194 attached to the bushing flange 188 and within the cylindrical flange 196 that is integral with the bushing flange 189. The intermediate stationary main contact 201 and the surrounding contact spring 203 are held in place by radially inwardly extending detents 204, FIG. 11, from a stop ring 205 which is telescoped within the contact flange member 195 and is held in place by it and the contact socket 194. The detents interfit between the fingers of the contact spring 203 and the fingers 200 of the main contact 201 and resist endwise movement thereof. A self aligning contact construction is provided by this arrangement.

The main movable contacts 197, FIGS. 11 and 12, when in engagement with the end stationary main contacts 164 and 173 and the intermediate stationary main contact 201 interconnect the end terminals provided by the plate 157 and the adapter 163 and provide a high current conducting path therebetween. Under conditions of momentary high current flow or flow of short circuit current, a substantial amount of heat is generated particularly when contact is made with the contacts fingers 165, 174, 200 and 202. Provision is made for supporting the main movable contacts 197 and operating them such that the support is substantially unaffected by the heat thus developed and they are maintained in insulated spaced relation in the open circuit position such that there is no likelihood of arcing over therebetween under normal operating conditions.

The main movable contacts 197 are generally tubular with their intermediate portions reduced in diameter and they are telescoped over an operating member 206 in the form of a rod of insulating material which is not only flexible but is strong in tension and compression. The main movable contacts 197 float on the operating member 206 and are held in place in spaced relation thereon, in part, by insulating collars 207 which are secured to the operating member 206 by epoxy cement 208. Annular shock absorbing members 209 are interposed between the insulating collars 207 and the adjacent ends of the main movable contacts 197. Preferably the annular shock absorbing members 209 are formed of O-rings of rubber like material. The right hand end of the main movable contact 197, FIG. 12, is held in place on the insulating operating member 206 by a metallic collar 210 which, like the collars 207, is secured to the operating member 206 by epoxy cement 211. A shock absorbing member 209 is interposed between the metallic collar 210 and the adjacent end of the main movable contact member 197. Since the contacts 197 float on the operating member 206 between the shock absorbing members 209, some independent longitudinal movement thereof is permitted which allows the operating mechanism to overcome individually the static starting friction of each of the contacts 197 instead of simultaneously for all of them.

It will be observed that the metallic collar 210 is threaded at 212 onto the adjacent end of the main contact operating rod 169 and that a clamp nut 213, also threaded on the main contact operating rod 169, serves to secure the metallic collar 210 in position. At the right hand end of the main contact operating rod 169 there is threaded across head 214 having trunnions 215 projecting therefrom for connection to the operating mechanism within the mechanism housing 22, to be described.

As pointed out above on flow of momentary heavy current or flow of short circuit current substantial heat is developed, particularly where the main movable contacts 197 engage with the contact fingers 165, 174, 200 and 202. It will be noted that the main movable contacts 197 float on the insulating operating member 206 and that the collars 207 and 210, which secure the main movable contacts 197 in place, are secured by the epoxy cement 208 and 211 at locations well spaced from the ends of the main movable contacts 197. The annular shock absorbing members 209, since they are formed of insulating material, provide an additional heat barrier to protect the cement 208 and 211 from the heat generated under these abnormal operating conditions.

While the end stationary main contacts 164 and 173 are firmly held in position, as described above, the intermediate main stationary contact 201 is loosely mounted but is held against endwise movement by the detents 204. Since the operating member 206, on which the main movable contacts 197 are mounted is flexible, a self aligning contact construction is provided which is capable of accommodating some degree of misalignment and thus does not require a high degree of accuracy in the fitting of the various parts.

The main movable contacts 197 are subjected to considerable shock when movement thereof is initiated from either the open or the closed position and likewise when they are arrested in either the open or the closed position. Some of this shock is absorbed in the inherent resiliency of the operating member 206. The annular shock absorbing members 209 also cushion the shock incident to the starting and stopping of the main movable contacts 197.

When the main movable contacts 197 are operated to the open circuit position, the main movable contact portion 198, FIG. 11 moves to the right into the intermediated stationary main contact 201 while the contact portion 198 of the other main movable contact 197 moves to the right into the end stationary main contact 164. The contacts 197 are spaced apart by the portion of the insulating operating member 206 therebetween and thus an air gap is provided in the circuit previously bridged by the respective main movable contact 197. The length of these air gaps is such as to prevent arc over in the open circuit position under normal operating conditions. In addition, the voltage dividing resistors 191 bridge the respective gaps and thus insure that the voltages applied to the respective gaps will be in accordance with the values of the resistance of the resistors 191.

When it is desired to employ more than two interrupter units 156, additional units of the construction shown in FIGS. 9 and 11 are added. In addition a longer operating member 206 is used and additional main movable contacts 197 are secured thereon by insulating collars 207, in the manner previously described, having annular shock absorbing members 209 therebetween. For example, if four units 156 are employed, there would be four main movable contacts 197 mounted on an operating member, such as the operating member 206, but correspondingly longer to accommodate the additional contacts 197.

It is desirable that the space occupied by the stationary contacts 164, 173 and 201 and by the main movable contacts 197 be free of contamination by the products of the arc which are developed as the result of opening of the circuit by the auxiliary contacts to be described in detail presently. For this purpose, as shown in FIGS. 11 and 12, annular sealing gaskets 216 are located in overlying relation to the contact flange members 195. It will be observed that the sealing gasket 216 at the left end of FIG. 11 is interposed between the terminal plate 157 and the adjacent end of contact socket 194 while the sealing gasket 216 at the right end of FIG. 12 is interposed between the bushing flange 189 and the adjacent end of the contact socket 194 as seen in FIG. 12.

It is desirable that the magnetic forces resulting from the flow of current be directed in such manner that the contact pressure applied to the cylindrical contact portions 198 and 199 of the main movable contacts 197 be increased with increasing current. It will be observed that the contact fingers 165 and 174 of the end stationary main contacts 164 and 173 and the contact fingers 200 and 202 of the intermediate stationary main contact 201 surround the respective contact portions 198 and 199. When current flows through these contact fingers, the magnetic forces resulting from such current flow tend to cause the contact fingers to move radially inwardly and thus to grip the contact portions 198 and 199 with increased pressure since the magnetic fields generated around the individual contact fingers seek a path of minimum reluctance. This effect can be described as a magnetic blow-on effect for the reason that it increases with increase in the magnitude of the current flow.

It will be understood that each of the main contacts and the gap provided thereby in open circuit condition has in parallel therewith an auxiliary contact and a corresponding gap when the interrupter 23 is in the open circuit position. The respective gaps are in series and the parallel connections are provided by the terminal plate 157 at the left end, the adapter 163 at the right end and the bushing flanges 188–189 intermediate the ends. Whether two or four or more interrupter units 156 are employed, the same general series parallel arrangement of the contacts and resulting gaps is employed together with voltage dividing resistors across the sets of parallel gaps to insure that the voltage distribution during open circuit conditions is maintained across the series connected gaps.

The description of the auxiliary contacts now will be completed with reference to FIGS. 9 and 10 of the drawings. Where the same elements are employed, the same reference characters are used. Because of the necessity for connecting the right hand interrupter unit 156, FIG. 10, to the operating mechanism, it necessarily is slightly different from the other interrupter units. These differences will be pointed out as the description proceeds.

Referring now to FIG. 10 of the drawings and to the right hand end thereof it will be noted that a cross head 219 is threaded onto the end of the auxiliary contact operating rod 171 which is in the form of a tube. The cross head 219 is provided with oppositely extending trunnions 220 to make connection to the operating mechanism. It is desirable that the parts of the auxiliary contacts which are movable with the auxiliary contact operating rod 171 be aligned in a predetermined fashion. This alignment will be made more clear by reference to the cross sections shown in FIGS. 14–20 which show the actual axial locations of the several parts which, in the interest of clarity, are shown in FIGS. 9 and 10 as being either in the plane of the paper or at right angles thereto. It will be noted in FIG. 20 that the cross head 219 and the trunnnions 220 are positioned along a vertical axis and this axis should be kept in mind as the axis of reference for the parts of the auxiliary contacts which are movable on movement of the auxiliary contact operating rod 171.

Again referring to FIG. 10 it will be noted that an auxiliary movable contact, shown generally at 221, is connected immediately to the left end of the rod 171. The contact 221 includes an auxiliary contact tip 222 which, as shown in FIG. 14, is provided with contact tip portions 222′ for engagement with contact fingers to be described and providing vent passageways between the contact portions for the escape of the products of the arc to a vent passage and thence to the atmosphere.

The auxiliary movable contact 221 has a shank 223 which is connected by a bayonet joint, shown generally at 224, to the operating rod 171. The bayonet joint 224 facilitates detachment of the operating rod 171 from the remaining movable parts and thus permits replacement or repair without requiring dismantling of the operating rod 171.

The construction of the bayonet joint 224 includes a plug 225 that is secured by pins 226 extending at right angles to each other to the rod 171. FIG. 20 shows the arrangement in more detail. Telescoped with the shank 223 and an extension of the plug 225 in a sleeve 227 which is secured to the shank 223 by a pin 228, FIG. 18. The upper end of the pin 228 projects through a slot 229 in a bayonet sleeve 230 which is employed for preventing relative rotation between the auxiliary movable contact 221 and the operating rod 171. A pin 231 extends through the plug 225 and through suitable slotted openings in the sleeve 227 for detachable connection thereto. The ends of the pin 231 project through the slot 229 in the sleeve 230 and a slot 232 on the underside thereof. Locking pins 233 extend axially of the shank 223 and the plug 225 for holding the transverse pins 228 and 231 securely in the position shown. On sliding the bayonet sleeve 230 to the left, the ends of the pin 231 are freed and relative rotation is permitted between the auxiliary movable contact 221 and the operating rod 171 to uncouple them or to couple them together as the case may be.

Previously, with reference to FIG. 9, the construction of the end stationary auxiliary contact 183 has been described. That contact is mounted in a sleeve 182 that is formed integrally with the terminal plate 157. The bushing flange 189, which forms a part of the intermediate terminal between the ends of the interrupter 23, is provided with a sleeve 237 which corresponds to the sleeve 182. Secured to the sleeve 237, FIG. 10, is an auxiliary stationary contact 183 which is constructed identically with the auxiliary contact shown in FIG. 9 and mounted on the terminal plate 157. The auxiliary contact 183, shown in FIG. 10, includes contact fingers 184 which are biased inwardly by the fingers of a contact spring 185. These contact fingers 184 are arranged to engage the outer surface of the contact tip 222 of the auxiliary movable contact 221 in the closed circuit position.

Provision is made for quickly and efficiently extinguishing the arc that is drawn on separation of the contact tip 222 from the contact fingers 184. It will be understood that the construction shown in FIGS. 9 and 10 provides for the formation of two arcs in series resulting in two gaps in the circuit when the arcs are extinguished. Identical constructions are employed for arc extinguishing purposes.

It will be observed that the contact tip 222 is arranged to be drawn into a bore 238 of a lining 239 which may be formed of a stack of fiber washers which evolve an arc extinguishing medium when subjected to the intense heat of an arc. The lining 239 is mounted within an insulating sleeve 240 that may be formed of a phenolic condensation product. The lining 239 is held in position at the right end of the sleeve 240 by a metallic retainer 241. Preferably the metallic retainer 241 is secured to thet sleeve 240 by epoxy cement 242. At the other end of the sleeve 240 there is a fiber retainer 243 which is secured in position by epoxy cement 244. As shown in FIGS. 15 and 17 the fiber retainer 243 is provided with recesses 245 which register with the contact portions 222', FIG. 14, of the auxiliary contact tip 222. This arrangement acts to confine the arc that is drawn to the contact portions 222' and the evolution of arc extinguishing material from the surfaces of the recesses 245. It will be observed in FIG. 14 that the contact fingers 184 are located centrally of the contact portions 222' thus placing them also in registry with the recesses 245.

Since repeated operation may damage the lining 235 such as to require its replacement, it is constructed and arranged in such manner that it can be replaced readily. It will be understood that the lining 239, surrounding sleeve 240 and retainers 241 and 243, together comprise a cartridge 246 which can be replaced as a unit should the occasion arise.

At the right hand end the cartridge 246 telescopes over a sleeve 247 that is formed integrally with the bushing flange 189. An O-ring 248 provides a sealed connection between the radially extending flange of the metallic retainer 241 and an adjacent shoulder of the sleeve 247. This sealed connection prevents escape of the arc products into the space within the insulator bushing 187 from the right end of the bore 238. Another O-ring 249 at the left end of the cartridge 246 is interposed between a shoulder of the fiber retainer 243 and a shoulder of a surrounding insulating housing 250, preferably formed of a phenolic condensation product, to provide a sealed connection at this end.

At the left end of the cylindrical insulating housing 250, FIG. 10, screws 251 extend radially inwardly into a metallic exhaust chute 252. The actual positioning of the screws 251 is shown in FIG. 14.

The metallic exhaust chute 252 has an elongated cylindrical throat portion 252' which restricts the flow of arc extinguishing gas that is particularly advantageous for interrupting low current arcs. The metallic exhaust chute 252 has an outflared throat portion 253 which discharges into a vent space 254 within the bushing flange 188. This vent space is closed off either by the adjacent bushing flange 189 for the intermediate terminal or by the terminal plate 157 for the end terminal shown in FIG. 9. It is highly desirable that the space 254 be in free communication with the atmosphere and further that this vent space be sealed away from the main contacts previously described. The reason for this is to limit the space that is contaminated by arc products and thus reduce the likelihood of arc over once the circuit has been interrupted.

As shown in FIG. 13 the metallic exhaust chute 252 includes a rectangular flange 255 that is secured by bolts 256 to the bushing flange 188.

Referring again to FIG. 10 it will be noted that the exhaust chute 252 has a cylindrical portion 258 surrounding the contact fingers 184 and communicating with the slots therebetween and through the recesses 245 with the bore 238. It will be understood that, when the contact tip 222 of the auxiliary movable contact 221 is withdrawn into the bore 238, the arc products can flow readily therefrom through the recesses 245, past the slabbed off portions of the contact tip 222, FIG. 14, between the contact portion 222' and through the slots between the contact fingers 184 to the cylindrical portion 258 of the exhaust chute 252. Then the products flow freely through the flared throat portion 253 to the vent space 254. As shown in FIG. 13 the vent space 254 communicates with the atmosphere through vents 259 which have discharge openings 260 that are provided with screens 261 to prevent the discharge of solid particles. It will be understood that the location of the vents 259 will depend upon whether the interrupter 23 is mounted horizontally, as shown in the drawings, or is mounted vertically. If a vertical mounting is employed, the vents 259 are turned so as to discharge downwardly and thus prevent the entrance of moisture, etc., into the vent space 254.

As pointed out, the positioning of the recesses 245 in the fiber retainer 243 with respect to the contact fingers 184 and contact portions 222' is important. In order to maintain the proper relationship a locating pin 262, FIGS. 10, 15 and 17, is used. It is threaded into the metallic exhaust chute 252 and projects into a suitable opening 262' in fiber retainer 243.

It is desirable that the arc which is drawn on movement of the auxiliary movable contact 221 out of engagement with the stationary contact fingers 184 be further confined within the bore 238. For this purpose a trailer construction is employed which moves with the movable contact 221. In addition advantage is taken of the trailer construction to provide a connection to the movable auxiliary contact of the next unit. This will be described presently.

Referring now particularly to FIGS. 10, 14, 15 and 17, it will be observed that a trailer rod 266 of insulating material is employed. Preferably the trailer rod 266 is formed of the same material as the operating member 205 on which the main movable contacts 197 are mounted.

The right end of the trailer rod 266 is telescoped within the contact tip 222 and it has a metallic sleeve 267 thereover which is cemented thereto. The reason for employing the metallic sleeve 267 is to permit the trailer rod 266 to be drilled for receiving a transverse pin 268 the actual position of which is indicated in FIG. 17. The transverse pin 268 extends into the walls of the auxiliary contact tip 222 and provides the necessary mechanical connection between the auxiliary movable contact 221 and the trailer rod 266. In order to protect the trailer rod 266 from the heat of the arc an insulating sleeve 269 is telescoped over the metallic sleeve 267 and the portion of the trailer rod 266 where it projects beyond the arcing end of the auxiliary contact tip 222. The insulating sleeve 269 extends into a tubular trailer 270 that is formed of material, such as methylmethacrylate resin, from which an arc extinguishing medium is evolved when it is subjected to the intense heat of an electric arc. It will be understood that the trailer 270 is drawn into the bore 238 with the result that the arc which is formed between the auxiliary contact tip 222 and one or more of the contact fingers 184 is confined between the exterior surface of the trailer 270 and the bore 238 and because of this confinement is quickly extinguished.

As shown in FIG. 9 the trailer rod 266 extends entirely through the tubular trailer 270 and through a trailer stop sleeve 271. The trailer stop sleeve 271 is preferably formed of resilient insulation to give shock resistance. The space between the trailer rod 266 and the inner surface of the tubular trailer 270 is sealed off by an O-ring 272. The O-ring seal 272 prevents the flow of products incident to the arc through the tubular trailer 270.

As indicated hereinbefore the trailer rod 266 is employed to provide a mechanical connection to one or more additional auxiliary movable contacts to effect conjoint movement thereof so that two or more gaps are provided in the circuit for facilitating interruption of the current flow. It is for this purpose that the trailer rod 266 extends well beyond the tubular trailer 270 and has telescoped therewith a trailer hitch socket 273 that is formed preferably of metal and is adhesively secured to the trailer rod 266. Extending transversely through the trailer rod 266 and trailer hitch socket 273 is a trailer hitch pin 274 the actual position of which is illustrated in FIG. 16. The trailer hitch pin also extends through a moving contact extension 275 in the form of a metallic tube which is telescoped at its right end over the trailer hitch socket 273. At its left end the moving contact extension 275 is telescoped with a sleeve portion 276 of an auxiliary movable contact 277 which otherwise corresponds to the auxiliary movable contact 221 previously described. The connection between the left end of the tubular moving contact extension 275 and the sleeve portion 276 of the auxiliary movable contact 277 is formed by brazing as indicated at 278. The contact tip 279 of the auxiliary movable contact 277 corresponds in every detail with the contact tip 222 and, as shown in FIG. 9, it is engaged by the contact fingers 184 in the circuit closed position.

It will be appreciated that the auxiliary movable contact 277 is provided with a trailer construction that is similar to the trailer construction for the auxiliary movable contacts 221. For this purpose a transverse pin 280 is provided the actual position of which is shown in FIG. 15. The transverse pin 280 serves to mechanically interconnect a second trailer rod 266 and a second tubular trailer 270 in the manner previously described. Where additional interrupter units 156 are employed, additional auxiliary contacts 277 are utilized and they are interconnected in the manner described. It is for this purpose that the trailer rod 266 shown at the left of FIG. 9 is provided with suitable connecting means for connection to another auxiliary movable terminal.

It will be appreciated that the current flow through contact fingers 184 of the auxiliary contacts 183 to the auxiliary movable contacts 221 and 277 is such as to increase the contact pressure therebetween as a function of the magnitude of the current flow.

It is desirable that a similar connection be provided between the auxiliary movable contact 277 and the intermediate terminal provided by the bushings 188–189 during the circuit opening operation. Since the connection to the intermediate terminal provided by the bushings 188–189 is outward rather than inward, provision is made for so directing the current flow during the circuit interrupting operation that the contact pressure or blow-on effect resulting from the magnetic field is such as to provide the increased pressure.

As shown in FIGS. 9 and 16 a moving contact metallic sleeve 283 is telescoped with the moving contact extension 275 and it has a friction fit therewith at its right hand end. It extends to the left for a substantial distance where it is brazed at 284 to a contact follower 285 which has integrally formed contact fingers 286 that extend to the right over the metallic sleeve 283 and into resilient contact engagement with the inner surface of the sleeve 247 that is formed integrally with the bushing 189. Since the current is required to flow in a reverse loop, the net result is to cause the contact fingers 286 to tend to move outwardly and exert a pressure on the inner surface of the sleeve 247 which depends upon the magnitude of current flow. In this manner the blow-on effect is maintained during circuit opening operation.

As the auxiliary movable contacts 221 and 277 are moved to the right during the circuit opening operation, the contact fingers 286 move therewith beyond the sleeve 247 and into engagement with the inner surface of the auxiliary contact 183 a portion of which is shown at the right side of FIG. 9. In order to bridge the inner surface of the sleeve 247 and the inner surface of the auxiliary contact 183 so that a symmetrical construction can be provided for the bushing flange 189, a conducting ring 287 is provided. It has a snug fit with the respective bushing flange 189.

With a view to holding the moving contact sleeve 283 and the associated contact follower 285 in position on the moving contact extension 277 a retainer sleeve 288 is provided in endwise alignment therewith between it and a shoulder on the contact tip 279. As shown in FIG. 15 the retainer sleeve 288 is slotted lengthwise as indicated at 289 to facilitate its being expanded so as to telescope over the contact follower 285 and permit disassembly of the movable parts.

The transverse pin 280 which mechanically interconnects the trailer rod 266, shown at the left of FIG. 9, with the auxiliary movable contact 277 is removably held in place by the retainer sleeve 288. The pin 280 has a reduced diameter end 290 which extends through a reduced portion of the slot 289 in the retainer sleeve 288. When this sleeve is removed, as described, it is possible to remove the transverse pin 280.

At the right end of the moving contact extension 275 the trailer hitch pin 274 has a reduced diameter end portion 291, FIG. 16, which projects into a longitudinally extending slot 292 in the moving contact metallic sleeve 283. This construction holds the trailer hitch pin 274 in place and also prevents rotation of the metallic sleeve 283 and contact follower 285 attached thereto.

As indicated hereinbefore it is desirable that the vent space 254 through which the arc products discharge be sealed off from the interior of the insulator bushings 187. For this purpose an O-ring seal 293 is provided between a radially outwardly extending flange of the metallic exhaust chute 252 and the flange 257 of the bushing flange 188. This construction is shown at the left hand of each of FIGS. 9 and 10.

It will be understood that the reverse turn contact construction provided by the metallic sleeve 283 and contact follower 285 is provided for each of the intermediate terminals of the interrupter 23. However, at the right end of the interrupter 23 reliance is placed entirely on the conductivity of the auxiliary contact operating rod 171 to complete the circuit to the mechanism housing 22 through the metallic parts connected therewith which serve to operate the rod 171. Since the current flow here is only momentary and since the conducting path through the various parts is relatively good, it is unnecessary to provide a construction at the right end of the auxiliary circuit interrupting contacts, FIG. 10, similar to that for the intermediate terminal. However, such construction can be employed throughout if desired.

The operating mechanism for the load current interrupter 23 is located within the housing 22 and is shown in more detail in FIGS. 24, 25, 26, and 27 of the drawings. As shown in FIGS. 14 and 27, bolts 300 are provided for securing the adapter 163 in place on the mechanism housing 22. Contact plugs 301 are secured to the wall of the housing 22 and project into suitable contact fingers 302 mounted on the adjacent wall of the adapter 163 in order to provide a low resistance current conducting path therebetween.

Interposed between the mechanism housing 22 and the adapter or end terminal member 163 is a conducting gasket 304 to provide an additional conducting path in parallel with that provided by the contact plugs 301 and contact fingers 302. Tests have shown that the conducting gasket 304, which also seals the junction between the mechanism housing 22 and the adapter 163, by itself provides a satisfactory connection. Accordingly, the contact plugs 301 and contact fingers 302 can be omitted. The conducting gasket 304 preferably is formed of conducting mesh, such as aluminum wire mesh, embedded in a flexible resilient body such as neoprene rubber.

FIG. 25 shows an insulator flange 304′ which is mounted on and rotates with the second insulator 17. It includes an upstanding sleeve 305 for receiving the lower end of the shaft 21 and it is keyed thereto by a key 306.

Mounted for rotation with the shaft 21 near its upper end by means of a key 309 is a mechanism cam 310. The cam 310 is the only part within the housing 22 which rotates conjointly with the shaft 21. Several of the other parts referred to hereinafter are rotatably mounted on the shaft 21 below the mechanism cam 310.

The mechanism cam 310 controls the operation of the mechanism within the housing 22. For this purpose it is provided with trip detents 310*a*, 310*b*, 310*c* and 310*d*. As will appear hereinafter these trip detents are used for effecting the operation of the load current interrupter 23 when the switch blade 25 approaches the line contact member 19 to various positions and then is reversed. The mechanism cam 310 is provided with corresponding pry out detents 310*a'*, 310*b'*, 310*c'* and 310*d'*.

When the switch blade 25 has been fully closed, the relative positions of the parts within the mechanism housing 22 are as shown in FIG. 24. On rotation of the shaft 21 and therewith the mechanism cam 310 in a counterclockwise direction to effect opening of the circuit, the trip detent 310*a* engages a shoulder 311 of a latch arm 312 which, as shown in FIG. 25, is rotatably mounted on a hub 313 of a main latch 314 that in turn is rotatably mounted on a stud 315 which is threaded into the underside of a boss 316 that is cast integrally with the mechanism housing 22. A spring 317 cooperates with the main latch 314 to bias it in a counterclockwise direction while a tension spring 318 reacts between the latch arm 312 and the main latch 314 to bias the former toward the latter. This arrangement provides a ratcheting effect to permit the movement of the trip detents 310*a*–*d* past the shoulder 311 when the mechanism cam 310 is rotated in a clockwise switch closing direction. The latch arm 312 has a shoulder 319 which engages a detent 320 on the main latch 314 to effect conjoint movement therewith in a clockwise direction on engagement of the shoulder 311 by any one of the trip detents 310*a*–*d*.

Near its outer end the main latch 314 has a shoulder 321. The shoulder 321 engages a shoulder 322 on a detent 323 which extends upwardly from a main operating arm 324, that has a hub portion 325 which is journaled on the shaft 21. At its outer end the main operating arm 324 has a bifurcated end portion 326 that is provided with apertures 327 for receiving pins 328, FIG. 28, that are connected by links 329 to trunnions 215 of the cross head 214 which is connected to and moves conjointly with the main contact operating rod 169. The operating rod 169 is tubular and it telescopes with a stationary guide rod 330 which is secured at 331 to a wall of the mechanism housing 22. It will be understood that the main operating arm 324 directly controls the movement of the main contact operating rod 169 which, in turn, controls the movement of the main movable contacts 197 of the load current interrupter 23.

The movement of the main operating arm 324 is effected by a main spring which comprises an outer spring 332 and an inner spring 333 as shown more clearly in FIGS. 25 and 27 of the drawings. The upper ends of the outer and inner spring 332 and 333 are turned inwardly to interfit with sockets on the under side of the main operating arm 324. The lower ends of the outer and inner springs 332 and 333 interfit with sockets 336 and 337 in an operating spring base 338 that is shown more clearly in FIG. 27 of the drawings. The operating spring base 338 is rotatably mounted on the shaft 21 and is held in position within the mechanism housing 22 by a bolt 339, FIG. 25. It will be understood that the operating spring base 338 can be variably positioned about the shaft 21 in order to vary the preloading tension of the outer and inner springs 332 and 333. Spring holders 340 and 341 cooperate with the upper and lower end turns of the outer and inner springs 332 and 333 to hold them in position with respect to the main operating arm 324 and the operating spring base 338. It will be understood that a single spring can be used in lieu of the outer and inner springs 332 and 333. However, the use of the two springs permits a more compact construction than is possible if a single spring is employed to give the same torque output.

Immediately above the hub portion 325 of the main operating arm 324, FIG. 25, is a prestressed auxiliary spring 343 which can be connected at its lower end to the upper side of the main operating arm 324 and at its upper end to the under side of an auxiliary operating arm 346 which has a hub portion 347 that is journaled on the shaft 21. As shown more clearly in FIG. 25 of the drawings, the outer end 348 of the auxiliary operating arm 346 is bifurcated and has apertures 349 to receive pins 350, FIG. 28, that are connected by links 351 to the trunnions 220 of the cross head 219 which is connected to and moves conjointly with the auxiliary contact operating rod 171. The operating rod 171 is tubular and it telescopes with a stationary guide rod 352 which is secured at 353 to a wall of the mechanism housing 22. It will be understood that the auxiliary contacts 221 and 277 are moved conjointly with the auxiliary contact operating rod 171 and, since it is connected by the links 351 and pin 350 to the auxiliary operating arm 346, the auxiliary contacts 221 and 277 move conjointly with the auxiliary operating arm 346.

In order to hold the auxiliary operating arm 346 in the position shown in FIG. 24 of the drawings corresponding to the closed positions of the auxiliary movable contacts 221 and 277, a pin 354, FIG. 25, depends therefrom for engagement with a detent 355 of an auxiliary latch 356 which includes an integral sleeve 357, FIG. 26, that is rotatably mounted on a shaft 358 which is carried by bosses 359 and 360 that are formed integrally with the mechanism housing 22. A spring 361, wound around the sleeve 357, cooperates with the auxiliary latch 356 to rock it in a clockwise direction, as viewed in FIG. 24, for holding the detent 355 in the path of the depending pin 354 on the auxiliary operating arm 346. One end 362 of the spring 361 bears against a tail piece 363 that forms a part of the auxiliary latch 356 and serves to bias it against an adjusting screw 364 which is employed for changing the position of the auxiliary latch 356 as may be required. The other end 365 of the spring 361 bears against the inner surface of the mechanism housing 22. A stop arm 366 is formed integrally with the auxiliary latch 356 to limit its movement into a counterclockwise direction when it is operated to the unlatched position.

Provision is made for swinging the auxiliary latch 356 to remove the detent 355 from the path of the pin 354. For this purpose a flange 367 depends from the under side of the auxiliary latch 356 to provide a track along which a pin 368 rides. The pin 368 is carried by the main operating arm 324 and is arranged to ride over a cam portion 369 when it has been swung through a substantial portion of its opening movement to cause the auxiliary latch 356 to rock in a counterclockwise direction, FIG. 24, and move the detent 355 out of the path of the pin 354. The prestressed auxiliary spring 343, which is further stressed by the movement of the main operating arm 324 to the position where the auxiliary latch 356 is operated, then is free to urge the auxiliary operating arm 346 in a clockwise direction to move the auxiliary contact operating rod 171 and therewith the auxiliary movable contacts 221 and 277 to effect interruption of the load current flow.

It is desirable to insure that the auxiliary operating arm 346 rotates to open the auxiliary movable contacts 221 and 277 which might become frozen under certain operating conditions. Also, it is desirable to impart some of the kinetic energy of the main movable contacts 197 and parts that move therewith to the auxiliary movable contacts 221 and 277 in order to accelerate them at a rate in excess of that at which they would be accelerated by the auxiliary spring 343 alone. For this purpose a link 370 is pivoted on a pin 371 that is carried by the main operating arm 324. The link 370 has an elongated slot 372 through which a pin 373, extending downwardly from the auxiliary operating arm 346 projects. It will be understood that the auxiliary operating arm 346 and parts movable therewith are accelerated further, when the outer end of the slot 372 picks up the pin 373 and effects conjoint movement of the auxiliary operating arm 346 with the main operating arm 324.

There is the possibility that the main movable contacts 197 may become frozen in the closed position. If this should occur, there is a possibility, when the main latch 314 is moved out of engagement with the shoulder 322 on the detent 323 which extends upwardly from the main operating arm 324, that the springs 332 and 333 would be incapable of breaking the main movable contacts 197 loose from the corresponding stationary contacts. Provision is made for insuring that the main movable contacts 197 are broken loose by providing a direct mechanical connection thereto from the shaft 21. For this purpose a pry out cam 374 is rotatably mounted on the shaft 21. It has a pry out surface 375 which is arranged to engage a shoulder 376, FIG. 24, on the detent 323 which is carried by and forms a part of the main operating arm 324. On the opposite side of the pry out cam 374 there is a cam surface 377 with which a roller 378 engages. The roller 378 is rotatably mounted on a pin 379, FIG. 26, which extends between arms 380 that project radially from a sleeve 381 that forms a part of a pry out lever which is shown, generally, at 382. The sleeve 381 is rotatably mounted on a shaft 383 which is carried by bosses 384 and 385 that are cast integrally with the mechanism housing 22. A spring 386, which surrounds the sleeve 381, cooperates with the pry out lever 382 to bias it in a counterclockwise direction as viewed in FIG. 24. An adjusting screw 387 is arranged to position the pry out lever 382 in the desired location. A tension spring 388 is strained between the pin 379 and a pin 389 on the pry out cam 374 to retrieve it.

The pry out lever 382 is also provided with another pair of arms 390 between which a pry out finger 391 is rotatably mounted on a pin 392. Surrounding the pin 392 is a spring 393 which reacts against the pry out finger 391 to rotate it in a clockwise direction with respect to the pry out lever 382. The position of the pry out finger 391 relative to the pry out lever 382 can be adjusted by a screw 394.

It will be noted that the pry out finger 391 has a shoulder 395 at its outer end which is located in the path of the pry out detents 310*a'*–*d'*. At the time that the trip detent 310*a*, for example, engages the shoulder 311 on the latch arm 312, the pry out detent 310*a'* engages the shoulder 395 on the pry out finger 391. The continued rotation of the mechanism cam 310 in the counterclockwise direction as indicated by the arrow 396 with the pry out detent 310*a'* in engagement with the shoulder 395 causes the pry out lever 382 to be rocked in a clockwise direction as viewed in FIG. 24. This shifts the position of the roller 378 in engagement with the cam surface 377 on the rear side of the pry out cam 374 and brings the pry out surface 375 into operative engagement with the shoulder 376 on the detent 323 in the event that the main movable contacts 197 have become frozen and no movement of the operating arm 324 has taken place. The continued movement of the mechanism cam 310 with the pry out detent 310*a'* in engagement with the shoulder 395 acts to break the main movable contacts 197 loose and frees them for movement under the biasing action of the springs 332 and 333.

The main and auxiliary operating arms 324 and 346 continue to rotate in a clockwise direction to effect the movement of the movable main contacts 197 and auxiliary movable contacts 221 and 277 to their fully open positions. The movement of the main and auxiliary operating arms 324 and 346 is arrested, as shown in FIG. 28, by engagement of faces 397 and 398 thereof with stop members 399 and 400 of wear resisting material such as brake lining material. The stop members 399 and 400 are commonly mounted on a metallic plate 401 which overlies blocks 402 and 403 of resilient material, such as rubber. Surrounding the guide rods 330 and 352 are tubular stop members 404 and 405 which bear against the plate 401 at one end and have stop rings 406 and 407 of material similar to that of which the stop members 399 and 400 are formed which are engaged by the cross heads 214 and 219. The blocks 402 and 403 bear against a wall of the mechanism housing 22 and absorb the shock incident to the stopping of the main and auxiliary operating arms 324 and 346 and parts movable therewith. By providing for independently arresting the main and auxiliary operating arms and the cross heads 214 and 219, substantially no shearing stress is applied to trunnions 215 and 220 or to the pins 328 and 350. In their final positions the main and auxiliary operating arms 324 and 346 have the faces 397 and 398 coplanar as shown in FIG. 28. This is permitted because of the lost motion connection provided by the slot 372 in the link 370.

It will be recalled that the continued rotation of the shaft 21, after interruption of the flow of load current by the load current interrupter 23, effects the movement of the switch blade 25 to the open position. During the continued rotation of the shaft 21 in the direction indicated by the arrows 396, FIG. 24, for opening the switch blade 25, the main contacts 197 and auxiliary contacts 221 and 277 are moved to their closed positions and the springs 332 and 333 are recocked. This is accomplished through the agency of a detent 408 which forms the head of a bolt 409 that is carried by an extension 410 or reclosing arm which is formed integrally with the mechanism cam 310. During the continued rotation of the mechanism 310 in the direction indicated by the arrows 396, the detent 408 engages the shoulder 322 on the detent 323 which is carried by the main operating arm 324. Accordingly, the continued movement of the mechanism cam 310 and reclosing arm 410 in the closing direction effects rotation of the main operating arm 324 in a counterclockwise direction and therewith the auxiliary operating arm 346 since the pin 373 on the latter now engages the inner end of the slot 372 in the same relation as shown in FIG. 24. The movement continues until the main contacts 197 and the auxiliary contacts 221 and 277 are reclosed. Then the shoulder 321 on the main latch 314 is moved by the spring 317 into latching engagement with the shoulder 322. Since the springs 332 and 333 were recocked by the reverse rotation of the main operating arm 324, the main latch 314 then holds them in this condition and holds the main contacts 197 in the closed positions. As the pin 368, carried by the main operating arm 324, rides over the beveled end surface 411 of the auxiliary latch 356, the latter is raised to permit the pin 368 to engage the under side of the flange 367. The continued movement of the auxiliary operating arm 346 brings the pin 354 into engagement with the beveled approach surface 412 on the back side of the detent 355 and lifts it to permit engagement thereby with the pin 354 under the influence of the spring 361.

The switch blade 25 now is in the full open position and the main contacts 197 and auxiliary contacts 221 and 277 of the load current interrupter 23 are in the closed positions. Further rotation of the shaft 21 in the opening direction is prevented by engagement of the stop shoulder 70 with the stop 72.

When the switch blade 25 is to be reclosed, the shaft 21 is rotated in a clockwise direction, insofar as the mechanism within the housing 22 is concerned, the trip detents 310*a*-*d* ratchet by the shoulder 311 of the latch arm 312 and likewise the pry out detents 310*a'*-*d'* ratchet by the shoulder 395 on the pry out finger 391. The initial position of the mechanism cam 310 for the closed position of the switch blade 25 is controlled by the engagement of the stop shoulder 71 with the other side of the stop 72 as shown in FIG. 7 of the drawings.

During the closing movement of the switch blade 25, should the operator decide to reverse its movement prior to the time when all of the trip detents 310*a*–*d* have ratcheted past the shoulder 311 on the latch arm 312, then the next trip detent, for example the trip detent 310*c*, will engage the shoulder 311 of the latch arm 312 and effect opening movement of the main contacts 197 and auxiliary contacts 221 and 277. As described in the patent above referred to the operator 38 compels the lineman to swing the handle 39 to its lowermost position in order to reclose the main contacts 197 and auxiliary contacts 271 and 277 of the load current interrupter 23 and to recock the springs 332 and 333 before another attempt can be made to swing the switch blade 25 to the closed position.

In the illustration just given the pry out detent 310c' would function as described hereinbefore for the pry out detent 310a' in operating the pry out cam 374.

Since certain further changes can be made in the foregiong construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A circuit interrupter comprising, in combination, a plurality of pairs of separable main contacts connected in series circuit relation, a plurality of pairs of separable auxiliary contacts connected in series circuit relation, circuit means directly and uninterruptedly connecting each pair of main contacts in parallel circuit relation with a pair of auxiliary contacts, voltage dividing resistance means directly and uninterruptedly connected in parallel circuit relation with each pair of parallel connected main and auxiliary contacts whereby the division of voltage across each pair during circuit opening and in open position is individually controlled; and means for simultaneously opening said main contacts to transfer the current flow to said auxiliary contacts and subsequently simultaneously opening said auxiliary contacts to effect circuit interruption by said auxiliary contacts, said means including an insulating contact operator mechanically interconnecting said main contacts, and another insulating contact operator mechanically interconnecting said auxiliary contacts, said voltage dividing resistance means remaining connected across each pair of parallel connected main and auxiliary contacts in open position.

2. A circuit interrupter comprising, in combination, a pair of end terminal members, means mounting said end terminal members in insulated spaced relation, two or more insulating housings mounted in endwise relation between and supported wholly by said end terminal members, one or more intermediate terminal members mounted between and supported wholly by said insulating housing, main and auxiliary stationary contact members carried by one of said end terminal members and by said one or more intermediate terminal members, main and auxiliary movable contact members movably mounted in each insulating housing for said main and auxiliary stationary contact members respectively and movable into and out of engagement therewith to provide in open position two or more series gaps between said end terminal members, there being one gap for each set of main contact members and another gap for each set of auxiliary contact members, circuit means connecting said gaps for each set of contact members in parallel circuit relation, voltage dividing resistance means within said housings directly and uninterruptedly bridging each set of parallel gaps, an insulating contact operator mechanically interconnecting said main movable contact members for simultaneously moving them to open position to transfer the current flow therethrough to said auxiliary contact members, and another insulating contact operator mechanically interconnecting said auxiliary movable contact members for subsequently moving them to open position to effect circuit interruption by said auxiliary contact members, said voltage dividing resistance means remaining connected across each set of parallel gaps to control the voltage across each set.

3. A circuit interrupter comprising, in combination, a pair of end terminal members, means mounting said end terminal members in insulated spaced relation, insulating housing means between and supported wholly by said end terminal members, one or more intermediate terminal members carried by said insulating housing means, main and auxiliary movable contact members in said insulating housing means for said main and auxiliary stationary contact members respectively and movable into and out of engagement therewith to provide in open position two or more series gaps between said end terminal members, there being one gap for each set of main contact members and another gap for each set of auxiliary contact members, circuit means for connecting said gaps for each set of contact members in parallel circuit relation, voltage dividing resistance means in said housing means surrounding each movable contact member in closed position within said insulating housing means and directly and uninterruptedly bridging each set of parallel gaps, insulating contact operating means within said housing means mechanically interconnecting said main movable contact members, insulating contact operating means within said housing means mechanically interconnecting said auxiliary contact members, and means connected to said contact operating means for simultaneously operating said main movable contact members to open position and subsequently operating said auxiliary movable contact members to open position to effect circuit interruption between said auxiliary stationary and movable contact members, said voltage dividing resistance means remaining connected across each set of parallel gaps to control the voltage across each set.

4. A circuit interrupter comprising, in combination, a pair of end terminal members, means mounting said end terminal members in insulated spaced relation, insulating housing means between and supported wholly by said end terminal members, one or more intermediate terminal members carried by said insulating housing means, main and auxiliary stationary contact members carried by one of said end terminal members and by said one or more intermediate terminal members, main and auxiliary movable contact members in said insulating housing means for said main and auxiliary stationary contact members respectively and movable into and out of engagement therewith to provide in open position two or more series gaps between said end terminal members, there being one gap for each set of main contact members and another gap for each set of auxiliary contact members, circuit means connecting said gaps for each set of contact members in parallel circuit relation, insulating contact operating means within and extending externally of said housing means and mechanically interconnecting said main movable contact members, insulating contact operating means within and extending externally of said housing means and mechanically interconnecting said auxiliary contact members, and means connected to said contact operating means for simultaneously operating said main movable contact members to open position and subsequently operating said auxiliary movable contact members to open position to effect circuit interruption between said stationary and movable auxiliary contact members and provide series connected sets of parallel connected gaps between said terminal members.

5. A circuit interrupter comprising, in combination, a pair of end terminal members, means mounting said end terminal members in insulated spaced relation, two or more insulating housings mounted in endwise relation between and supported wholly by said end terminal members, one or more intermediate terminal members mounted between and supported wholly by said insulating housings, main and auxiliary contact members carried by one of said end terminal members and by said one or more intermediate terminal members, main and auxiliary movable contact members movably mounted in each insulating housing for said main and auxiliary stationary contact members respectively and movable into and out of engagement therewith to provide in open position two or more series gaps between said end terminal members for each set of main and auxiliary contact members, circuit means connecting said gaps respectively in parallel circuit relation, sealing means in said housings segregating the gaps associated with said main stationary and movable contact members from the gaps associated with said auxiliary stationary and movable contact members, and venting means placing the last mentioned gaps in communication with the atmosphere to permit discharge thereto of the arc products resulting from opening said auxiliary contact members under load.

6. A circuit interrupter comprising, in combination, a pair of end terminal members, means mounting said end terminal members in insulated spaced relation, insulating housing means between and supported wholly by said end terminal members, one or more intermediate terminal members carried by said insulating housing means, main and auxiliary stationary contact members carried by one of said terminal members and by said one or more intermediate terminal members, main and auxiliary movable contact members in said insulating housing means for said main and auxiliary stationary contact members respectively and movable into and out of engagement therewith to provide in open position two or more series gaps between said end terminal members for each set of main and auxiliary contact members, circuit means connecting said gaps respectively in parallel circuit relation, voltage dividing resistance means within said housing means directly and uninterruptedly bridging said parallel gaps, insulating contact operating means within said housing means mechanically interconnecting said main movable contact members, insulating contact operating means within said housing means mechanically interconnecting said auxiliary contact members, and means connected to said contact operating means for simultaneously operating said main movable contact members to open position and subsequently operating said auxiliary movable contact members to open position to effect circuit interruption between said auxiliary stationary and movable contact members, said voltage dividing resistance means remaining connected across each set of parallel gaps to control the voltage across each set.

7. A circuit interrupter comprising, in combination, a pair of end terminal members, means mounting said end terminal members in insulated spaced relation, two or more insulating housings mounted in endwise relation between and supported by said end terminal members, one or more intermediate terminal members mounted between and supported by said insulating housing, main and auxiliary stationary contact members carried by one of said end terminal members and by said one or more intermediate terminal members, main and auxiliary movable contact members movably mounted in each insulating housing for said main and auxiliary stationary contact members respectively and movable into an out of engagement therewith to provide in open position two or more series gaps between said end terminal members for each set of main and auxiliary contact members, circuit means connecting said gaps respectively in parallel circuit relation, insulating contact operating means within said housings mechanically interconnecting said main movable contact members, insulating contact operating means within said housings mechanically interconnecting said auxiliary contact members, and means connected to said contact operating means for simultaneously operating said main movable contact members to open position and subsequently operating said auxiliary movable contact members to open position to effect circuit interruption between said auxiliary stationary and movable contact members.

8. A circuit interrupter comprising, in combination, a plurality of pairs of stationary cylindrical contact members with each pair in insulated spaced relation along their common longitudinal axis, tubular contact members movable endwise along said axis for bridging each pair of contact members, an insulating operating member extending through said movable contact members, a collar at each end of each movable contact member telescoped with said insulating operating member and secured thereto to hold said contact members in spaced relation, and shock absorbing means interposed between each collar and the adjacent end of the respective contact member.

9. A circuit interrupter comprising, in combination, a plurality of pairs of stationary cylindrical contact members with each pair in insulated spaced relation along their common longitudinal axis, tubular contact members movable endwise along said axis for bridging each pair of contact members, an insulating operating member extending through said movable contact members, a collar at each end of each movable contact member telescoped with said insulating operating member and secured thereto to hold said contact members in spaced relation, a conducting sleeve surrounding and connected to the cylindrical contact of each paid and extendnig toward the other contact of each pair, and a tubular voltage dividing resistor overlying each movable contact member in closed position and telescoped with an connected to the conducting sleeves at the ends thereof.

10. A circuit interrupter comprising, in combination, a plurality of pair of stationary cylindrical contact members with each pair in insulated spaced relation along their common longitudinal axis, tubular contact members movable endwise along said axis for bridging each pair of contact members, an insulating operating member extending through said movable contact members, and a collar at each end of each movable contact member telescoped with said insulating operating member and adhesively secured thereto at a location spaced a substantial distance from the area of contact engagement between the respective end of each movable contact member and the associated cylindrical contact member to hold said contact members in spaced relation under operating conditions including momentary overloads resulting in generation of abnormal heat.

11. A circuit interrupter comprising, in combination a plurality of pairs of stationary cylindrical contact members with each pair in insulated spaced relation along their common longitudinal axis, tubular contact members movable endwise along said axis for bridging each pair of contact members, an insulating operating member extending through said movable contact members, and a collar at each end of each movable contact member telescoped with said insulating operating member and adhesively secured thereto at a location spaced a substantial distance from the area of contact engagement between the respective end of each movable contact member and the associated cylindrical contact member to hold said contact members in spaced relation under operating conditions including momentary overloads resulting in generation of abnormal heat, and a shock absorbing heat insulating member interposed between each collar and the adjacent end of the respective contact member.

12. A circuit interrupter comprising, in combination, a plurality of pairs of relatively stationary cylindrical contact members extending toward each other with each pair in insulated spaced relation along their common longitudinal axis the end pairs of contacts including end contact members at the ends of said plurality of pairs of contacts and intermediate contacts with said intermediate contact members joined together, a stationary retaining ring surrounding each set of intermediate contact members having one or more radially inwardly projecting fingers interfitting with the respective contact members to prevent endwise movement thereof, contact members movable endwise along said axis for bridging each pair of contact members, and installing means interconnecting said contact members and operable to effect conjoint movement thereof between open and closed position.

13. A circuit interrupter comprising, in combination, a pair of stationary cylindrical contact members in insulated spaced relation along a common axis and extending in the same direction, one of said contact members having a cylindrical extension toward the other contact member, a pair of movable contact members telescoped within said stationary contact members in closed position, means interconnecting said movable contact members including an insulating member secured to the one movable contact member associated with said one stationary contact member and a conducting member secured to said insulating member, and reverse turn sliding contact means interconnecting said cylindrical extension and said conducting member and maintaining a circuit therebetween during separation of said movable contact members from the respective stationary contact members.

14. A circuit interrupter comprising, in combination, a pair of stationary cylindrical contact members in insulated spaced relation along a common axis and extending in the same direction, one of said contact members having a cylindrical extension toward the other contact member, a pair of movable contact members telescoped within said stationary contact members in closed position, means interconnecting said movable contact members including an insulating member secured to the one movable contact member associated wtih said one stationary contact member and a conducting member secured to said insulating member, and reverse turn sliding contact means interconnecting said cylindrical extension and said conducting member and maintaining a circuit therebetween during separation of said movable contact members from the respective stationary contact members, said reverse turn sliding contact means including a conducting sleeve connected to said conducting member at the end remote from the other movable contact member and extending toward the same and a conducting follower telescoped over said conducting sleeve and connected thereto at the end adjacent said other movable contact member and having contact fingers extending away from said other contact member into contact engagement with the inside of said cylindrical extension and engaging the same under pressure determined in part by the magnitude of the current flow therethrough.

15. A circuit interrupter comprising, in combination, a pair of stationary cylindrical contact members in insulated spaced relation along a common axis and extending in the same direction, one of said contact members having a cylindrical extension toward the other contact member, a pair of movable contact members telescoped within said stationary contact members in closed position, means interconnecting said movable contact members including an insulating member secured to the one movable contact member associated with said one stationary contact member and a conducting member secured to said insulating member, tubular insulating means in endwise alignment with each stationary contact into which the respective movable contact member can be withdrawn and from the inner surface of which an arc extinguishing medium can be evolved due to the heat of an arc, an insulating trailer secured to each movable contact member for movement therewith into the respective tubular insulating means, the trailer secured to said one movable contact member having said insulating member extending therethrough, and reverse turn sliding contact means interconnecting said cylindrical extension and said conducting member and maintaining a circuit therebetween during separation of said movable contact members from the respective stationary contact members.

16. The invention as set forth in claim 15 wherein each of the stationary contact members includes a plurality of contact fingers and the end of each tubular insulating means adjacent the respective stationary contact member has a recess registering with each contact finger to assist in restricting the arc when drawn to the respective contact finger.

17. A circuit interrupter comprising, in combination, a pair of end terminal members, means mounting said end terminal members in insulated spaced relation, an insulating housing between and supported wholly by said end terminal members, main and auxiliary stationary contact members connected to said end terminal members, main and auxiliary movable contact members in said insulating housing for said main and auxiliary stationary contact members respectively and independently movable into and out of engagement therewith to provide in open position two gaps between said end terminal members in parallel circuit relation; and means for operating said main movable contact member to open position and subsequently operating said auxiliary movable contact member to open position to effect circuit interruption between said auxiliary stationary and movable contact members including a main operator extending outside said insulating housing and mechanically connected to said main movable contact members, and an auxiliary operator extending outside said insulating housing and mechanically connected to said auxiliary movable contact and movable independently of said main operator.

18. A circuit interrupter comprising, in combination, a pair of end terminal members, means mounting said end terminal members in insulated spaced relation, an insulating housing between and supported wholly by said end terminal members, main and auxiliary stationary contact members connected to said end terminal members, main and auxiliary movable contact members in said insulating housing for said main and auxiliary stationary contact members respectively and movable into and out of engagement therewith to provide in open position two gaps between said end terminal members in parallel circuit relation, means individually biasing said main and auxiliary movable contact members toward open position, means individually latching said main and auxiliary contacts in closed position, and means for tripping the latch means individual to said main movable contact to release the same for movement by its biasing means to open position and subsequently tripping the latch means individual to said auxiliary movable contact to release the same for movement by its biasing means to open position.

19. A circuit interrupter comprising, in combination, a pair of end terminal members, means mounting said end terminal members in insulated spaced relation, an insulating housing between and supported wholly by said end terminal members, main and auxiliary stationary contact members connected to said end terminal members, main and auxiliary movable contact members in said insulating housing for said main and auxiliary stationary contact members respectively and movable into and out of engagement therewith to provide in open position two gaps between said end terminal members in parallel circuit relation, means individually biasing said main and auxiliary movable contact members toward open position, means individually latching said main and auxiliary contacts in closed position, means for tripping the latch means individual to said main movable contact to release the same for movement by its biasing means to open position and subsequently tripping the latch means individual to said auxiliary movable contact to release the same for movement by its biasing means to open position, and means operatively interconnecting said main and auxiliary movable contacts when the former has been moved by its biasing means through a predetermined extent to impart to said auxiliary movable contact a portion of the kinetic energy of said main movable contact.

20. A circuit interrupter comprising, in combination, first and second end terminal members, means mounting said end terminal members in insulated spaced relation; a plurality of interrupter units mounted in end to end relation between and supported wholly by said end terminal members each including an insulating housing having a first conducting support at one end and a second conducting support at the other end, the first support of the interrupter unit adjacent said first terminal being mounted thereon and the second support of the interrupter unit adjacent said second terminal being mounted thereon, the second support of said unit adjacent said first terminal being mounted on the first support of the next unit and the first support of said unit adjacent said second terminal being mounted on the second support of the preceding unit, a pair of main stationary contact members and a pair of auxiliary contact members carried by said first and second supports with one contact of each pair being located at one end of said insulating housing and the other contact of each pair being located at the other end of said insulating housing, and main and auxiliary movable contact members for said main and auxiliary stationary contact members respectively and movable into and out of engagement therewith to provide in open position at least two series gaps between said end terminal members for each set of main and auxiliary contact members with the gaps in each interrupter unit being in parallel circuit relation; insulating means mechanically interconnecting said main movable contact members, insulating means mechanically interconnecting said auxiliary movable contact members, and means for simultaneously operating said main movable contact members to open position and subsequently operating said auxiliary movable contact members to open position.

References Cited by the Examiner

UNITED STATES PATENTS

| | | | |
|---|---|---|---|
| 2,340,827 | 2/44 | Thommen | 200—145 |
| 2,462,285 | 2/49 | Rees | 200—146 |
| 2,539,352 | 1/51 | Hewlett | 200—163 |
| 2,581,571 | 1/52 | Baker et al. | 200—148 |
| 2,599,100 | 6/52 | Forwald | 200—145 |
| 2,679,567 | 5/54 | Kradel | 200—146 |
| 2,710,322 | 6/55 | Price | 200—146 |
| 2,748,226 | 5/56 | MacNeill et al. | 200—148 |
| 2,921,168 | 1/60 | Forwald | 200—148 |

FOREIGN PATENTS 400,716 11/33 Great Britain.

BERNARD A. GILHEANY, *Primary Examiner.*

MAX L. LEVY, *Examiner.*